United States Patent
Iwata et al.

(10) Patent No.: US 12,378,416 B2
(45) Date of Patent: Aug. 5, 2025

(54) THERMALLY-CONDUCTIVE TWO-PART ADDITION-CURABLE SILICONE COMPOSITION AND METHOD FOR PRODUCING THE SAME

(71) Applicant: SHIN-ETSU CHEMICAL CO., LTD., Tokyo (JP)

(72) Inventors: Mitsuhiro Iwata, Takasaki (JP); Toko Takahashi, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 282 days.

(21) Appl. No.: 18/019,007

(22) PCT Filed: Jun. 14, 2021

(86) PCT No.: PCT/JP2021/022492
§ 371 (c)(1),
(2) Date: Jan. 31, 2023

(87) PCT Pub. No.: WO2022/030108
PCT Pub. Date: Feb. 10, 2022

(65) Prior Publication Data
US 2023/0242766 A1    Aug. 3, 2023

(30) Foreign Application Priority Data

Aug. 6, 2020 (JP) .................... 2020-133644

(51) Int. Cl.
*C08L 83/06* (2006.01)

(52) U.S. Cl.
CPC ......... *C08L 83/06* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 7,166,363 B2 | 1/2007 | Meguriya et al. | |
| 2005/0048296 A1 | 3/2005 | Meguriya et al. | |
| 2005/0250903 A1 | 11/2005 | Tanaka et al. | |
| 2010/0193961 A1* | 8/2010 | Konishi | C08L 83/00 257/773 |
| 2022/0411589 A1 | 12/2022 | Wata et al. | |

FOREIGN PATENT DOCUMENTS

| | | | |
|---|---|---|---|
| CN | 1696202 A | | 11/2005 |
| CN | 102666383 A | | 9/2012 |
| CN | 107735859 A | | 2/2018 |
| JP | H05-001237 A | | 1/1993 |
| JP | H11-049959 A | | 2/1999 |
| JP | 2005281063 A | * | 10/2005 |
| JP | 2005-344106 A | | 12/2005 |
| JP | 2010-138384 A | | 6/2010 |
| JP | 2011-116806 A | | 6/2011 |
| JP | 2011-122084 A | | 6/2011 |
| JP | 2015199811 A | * | 11/2015 |
| JP | 2019-131734 A | | 8/2019 |
| WO | 2017030126 A1 | | 2/2017 |
| WO | 2021095501 A1 | | 5/2021 |

OTHER PUBLICATIONS

English Machine Translation of JP2005281063A (Year: None).*
English Machine Translation of JP2011122084A (Year: None).*
English Machine Translation of JP2015199811A (Year: None).*
English Machine Translation of JP2019131734A (Year: None).*
Dec. 7, 2023 extended Search Report issued in European Patent Application No. 21852983.2.
Apr. 29, 2024 Search Report issued in Chinese Patent Application No. 202180057993.4.
Aug. 10, 2021 International Search Report issued in International Patent Application No. PCT/JP2021/022492.
Feb. 7, 2023 International Preliminary Report on Patentability issued in International Patent Application No. PCT/JP2021/022492.

* cited by examiner

*Primary Examiner* — Randy P Gulakowski
*Assistant Examiner* — Holley Grace Hester
(74) *Attorney, Agent, or Firm* — Oliff PLC

(57) ABSTRACT

A thermally-conductive two-part addition-curable silicone composition including a first liquid and a second liquid and a method of producing the same. The first liquid includes a heat-treated mixture including an organopolysiloxane having two or more alkenyl groups and aluminum oxide having $Na^+$ ion content equal to or lower than 100 ppm, a platinum-group metal catalyst, and an ion-trapping agent of a cation-exchange type and/or a cation-and-anion-exchange type. The second liquid includes a heat-treated mixture including an organopolysiloxane having two or more alkenyl groups, an organohydrogenpolysiloxane having three or more SiH groups, aluminum oxide having $Na^+$ ion content equal to or lower than 100 ppm, and an organohydrogenpolysiloxane having two SiH groups.

8 Claims, No Drawings

THERMALLY-CONDUCTIVE TWO-PART ADDITION-CURABLE SILICONE COMPOSITION AND METHOD FOR PRODUCING THE SAME

TECHNICAL FIELD

The present invention relates to a thermally-conductive two-part addition-curable silicone composition having excellent thermal conductivity and a method for producing the same.

BACKGROUND ART

In recent years, as electronic component circuits are becoming more highly integrated and using higher voltage, the amount of heat generated by ICs and circuits has increased. Therefore, thermally-conductive silicone compositions are used for the purpose of alleviating thermal stress.

It is known that a filler having favorable thermal conductivity may be used for the purpose of alleviating the thermal stress. As such fillers, silica powders, aluminum oxide powders, silicon carbide powders, silicon nitride powders, aluminum nitride powders, magnesium oxide powders, diamond powders, powders of metal such as iron, stainless steel, and copper, carbon powders, and the like are known.

However, among the above fillers, metal powders and carbon powders, which have electrical conductivity, cannot be used in a thermally-conductive silicone composition used for an electrical insulation purpose. Both silicon carbide powders and diamond powders are materials having high hardness, and wiring and elements in a substrate filled by these powders have a risk of wear and cutting. It is possible to use silicon nitride powders, aluminum nitride powders, magnesium oxide powders, or the like in view of electrical insulation. However, since all of these powders exhibit hydrolyzability and therefore lack long-term preservation stability, it has been difficult to ensure preservability of the thermally-conductive two-part addition-curable silicone composition.

In view of the above, examples of actually usable fillers include silica powders and aluminum oxide powders. However, silica powders have insufficient thermal conductivity. If high thermal conductivity is to be imparted to the silica powders, workability matter such as a viscosity of the silicone composition is significantly reduced. Furthermore, it is known that when the aluminum oxide powders are used, by the effect of Al—OH groups remaining on an alumina surface, the groups react with hydrogen atoms bonded to silicon atoms to cause a dehydrogenation reaction. The influence of the dehydrogenation reaction cannot be ignored in low-hardness materials whose crosslinking density is set to be low. As a countermeasure for the dehydrogenation, there have been proposed the use of aluminum oxide treated with silylketene acetal or the like (Patent Document 1) and a silicone gel composition in which the pH of aluminum oxide is specified (Patent Document 2).

However, the aluminum oxide of which surface is treated with silylketene acetal has a concern about the change in hardness over heat aging, and is difficult to be used in an environment where stress relaxation is a main purpose. Furthermore, in the aluminum oxide whose pH is specified, an inorganic-acid treatment agent is used, and a dehydrogenation reaction occurs over time due to the residual inorganic acid, making it difficult to suppress change in hardness over time.

Therefore, there has been proposed a thermally-conductive silicone gel composition with excellent flowability and long-term preservability, and an excellent stress relaxation property and little change in hardness over time after curing. However, there is no description regarding specific thermal conductivity or a thermally-conductive two-part addition-curable silicone composition. Furthermore, Na$^+$ ion content after boiling and extraction of the specified aluminum oxide is too high, so that the proposed thermally-conductive silicone gel composition has been insufficient in a case where the thermal conductivity is 2.0 W/m·K or more (Patent Document 3).

CITATION LIST

Patent Literature

Patent Document 1: JP H05-001237 A
Patent Document 2: JP H11-049959 A
Patent Document 3: JP 2011-122084 A

SUMMARY OF INVENTION

Technical Problem

Therefore, there has been a need for a thermally-conductive two-part addition-curable silicon composition having excellent stress relaxation and insulation properties that can be incorporated into electronic equipment without damaging heat-generating electronic components such as power devices, transistors, thyristors, and central processing units (CPUs), especially when used as a heat-dissipating component for electronic components, and a method for producing the same.

The present invention was made in view of the above circumstances, and has its purpose to provide a thermally-conductive two-part addition-curable silicone composition that can be applied inside a module including electrical and electronic components and a circuit board having these components mounted thereon, and that can exhibit an excellent stress relaxation property and thermal conductivity after curing, and also provide a method for producing the same.

Solution to Problem

In order to solve the above-mentioned problem, the present invention provides
a thermally-conductive two-part addition-curable silicone composition, including a first liquid and a second liquid,
the first liquid including:
a heat-treated mixture including
(A) an organopolysiloxane represented by the following average composition formula (1), $$R_aR^1{}_bSiO_{(4-a-b)/2} \qquad (1)$$

wherein R independently represents an alkenyl group, $R^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4, the organopolysiloxane having at least two alkenyl groups bonded to a silicon atom in one molecule, and
(C) aluminum oxide having Na$^+$ ion content equal to or lower than 100 ppm, the Na$^+$ ion content being determined by measuring an aqueous layer by ion chromatography, the aqueous layer being heat extract from aluminum oxide powders with pure water at 120° C. for 48 hours,
the component (C) having been subjected to surface treatment with a part of the component (A);
(E) a platinum-group metal catalyst; and
(F) an ion-trapping agent of a cation-exchange type and/or a cation-and-anion-exchange type, carrying at least one element selected from Zr, Bi, Sb, Mg, and Al,
the second liquid including:
a heat-treated mixture including
(A) an organopolysiloxane represented by the following average composition formula (1), $$R_a R^1_b SiO_{(4-a-b)/2} \tag{1}$$

wherein R independently represents an alkenyl group, $R^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4, the organopolysiloxane having at least two alkenyl groups bonded to a silicon atom in one molecule,
(B) an organohydrogenpolysiloxane represented by the following average composition formula (2), $$R^2_c H_d SiO_{(4-c-d)/2} \tag{2}$$

wherein $R^2$ independently represents an unsubstituted or substituted monovalent hydrocarbon group having no aliphatic unsaturated bond, "c" represents 0.7 to 2.2, "d" represents 0.001 to 0.5, and "c+d" represents a positive number satisfying 0.8 to 2.5, the organohydrogenpolysiloxane having at least three hydrogen atoms bonded to a silicon atom in one molecule, and
(C) aluminum oxide having N ion content equal to or lower than 100 ppm, the $Na^+$ ion content being determined by measuring an aqueous layer by ion chromatography, the aqueous layer being heat extract from aluminum oxide powders with pure water at 120° C. for 48 hours, the component (C) having been subjected to surface treatment with a part of the component (B); and
(D) an organohydrogenpolysiloxane represented by the following average composition formula (3), $$R^3_e H_f SiO_{(4-e-f)/2} \tag{3}$$

wherein $R^3$ independently represents an unsubstituted or substituted monovalent hydrocarbon group having no aliphatic unsaturated bond, "e" represents 0.7 to 2.2, "f" represents 0.001 to 0.5, and "e+f" represents a positive number satisfying 0.8 to 2.5, the organohydrogenpolysiloxane having at least two hydrogen atoms bonded to a silicon atom in one molecule,
in which the first liquid does not contain the components (B) and (D), and the second liquid does not contain the components (E) and (F),
in the composition, the component (A) is contained in an amount of 100 parts by mass in total, the component (B) is contained in an amount such that a number of the hydrogen atom bonded to a silicon atom (SiH group) in the component (B) is 0.1 to 2 per one alkenyl group in the component (A), the component (C) is contained in an amount of 1,000 to 7,000 parts by mass in total, the component (D) is contained in an amount such that a number of the hydrogen atom bonded to a silicon atom (SiH group) in the component (D) is 0.01 to 3 per one alkenyl group in the component (A), the component (E) is contained in an amount of 1 to 200 ppm in mass of a platinum group metal relative to the component (A), and the component (F) is contained in an amount of 0.01 to 10 parts by mass, and
the first liquid and the second liquid each have a thermal conductivity of 2.0 to 7.0 W/m·K in a hot disk method according to ISO 22007-2, and the first liquid and the second liquid each have a viscosity at 25° C. of 30 to 800 Pa·s when measurement is performed at a rotation number of 10 rpm at shear rate 6 (1/sec) in a rotor A using a spiral viscometer.

With such thermally-conductive two-part addition-curable silicone composition, preservability is improved and change in hardness over time can be suppressed. The thermally-conductive two-part addition-curable silicone as a cured product of the above composition can be suitably used to protect electrical and electronic components and circuit boards having these components mounted thereon, and therefore can exhibit the excellent stress relaxation property and thermal conductivity.

Furthermore, it is preferable that a total amount of the SiH groups in the component (B) and the component (D) be in a ratio of 0.11 to 5 per one alkenyl group in the component (A).

With such configuration, it is possible to obtain a stable silicone cured product, which is not too hard to become brittle.

Furthermore, it is preferable that the heat-treated mixture in the first liquid and the heat-treated mixture in the second liquid further include
(G) a silane coupling agent and/or
(H) an organopolysiloxane represented by the following general formula (4),

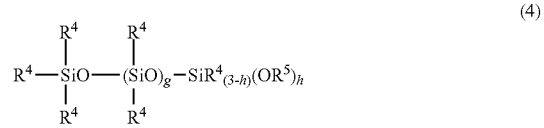

wherein each $R^4$ independently represents an unsubstituted or substituted monovalent hydrocarbon group, $R^5$ independently represents an alkyl group, an alkoxyalkyl group, an alkenyl group, or an acyl group, "g" represents an integer of 5 to 100, and "h" represents an integer of 1 to 3, the organopolysiloxane having a viscosity at 25° C. of 0.01 to 30 Pa·s.

In such thermally-conductive two-part addition-curable silicone composition, it is possible to reduce the viscosity of the first liquid and the second liquid.

Furthermore, also provided is a method for producing a thermally-conductive two-part addition-curable silicone composition to prepare a composition including a first liquid and a second liquid, the method including a process of preparing the first liquid and a process of preparing the second liquid,
in which the process of preparing the first liquid includes:
performing heat treatment at a temperature of 70° C. or more to a mixture including
(A) an organopolysiloxane represented by the following average composition formula (1), $$R_a R^1_b SiO_{(4-a-b)/2} \tag{1}$$

wherein R independently represents an alkenyl group, $R^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4, the organopolysiloxane having at least two alkenyl groups bonded to a silicon atom in one molecule, and
  (C) aluminum oxide having Na⁺ ion content equal to or lower than 100 ppm, the Na⁺ ion content being determined by measuring an aqueous layer by ion chromatography, the aqueous layer being heat extract from aluminum oxide powders with pure water at 120° C. for 48 hours,
to perform surface treatment of the component (C) with a part of the component (A), and subsequently adding and mixing to the cooled heat-treated mixture
(E) a platinum-group metal catalyst, and
(F) an ion-trapping agent of a cation-exchange type and/or a cation-and-anion-exchange type carrying at least one element selected from Zr, Bi, Sb, Mg, and Al; and
the process of preparing the second liquid includes:
  performing heat treatment at a temperature of 70° C. or more to a mixture including
    (A) an organopolysiloxane represented by the following average composition formula (1), $$R_a R^1_b SiO_{(4-a-b)/2} \quad (1)$$

wherein R independently represents an alkenyl group, $R^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4, the organopolysiloxane having at least two alkenyl groups bonded to a silicon atom in one molecule, and
    (B) an organohydrogenpolysiloxane represented by the following average composition formula (2), $$R^2_c H_d SiO_{(4-c-d)/2} \quad (2)$$

wherein $R^2$ independently represents an unsubstituted or substituted monovalent hydrocarbon group having no aliphatic unsaturated bond, "c" represents 0.7 to 2.2, "d" represents 0.001 to 0.5, and "c+d" represents a positive number satisfying 0.8 to 2.5, the organohydrogenpolysiloxane having at least three hydrogen atoms bonded to a silicon atom in one molecule, and
    (C) aluminum oxide having N ion content equal to or lower than 100 ppm, the Na⁺ ion content being determined by measuring an aqueous layer by ion chromatography, the aqueous layer being heat extract from aluminum oxide powders with pure water at 120° C. for 48 hours,
  to perform surface treatment of the component (C) with a part of the component (B), and subsequently adding and mixing to the cooled heat-treated mixture
    (D) an organohydrogenpolysiloxane represented by the following average composition formula (3), $$R^3_e H_f SiO_{(4-e-f)/2} \quad (3)$$

wherein $R^3$ independently represents an unsubstituted or substituted monovalent hydrocarbon group having no aliphatic unsaturated bond, "e" represents 0.7 to 2.2, "f" represents 0.001 to 0.5, and "e+f" represents a positive number satisfying 0.8 to 2.5, the organohydrogenpolysiloxane having at least two hydrogen atoms bonded to a silicon atom in one molecule,
in which the first liquid does not contain the components (B) and (D), and the second liquid does not contain the components (E) and (F),
in the composition, the component (A) is contained in an amount of 100 parts by mass in total, the component (B) is contained in an amount such that a number of the hydrogen atom bonded to a silicon atom (SiH group) in the component (B) is 0.1 to 2 per one alkenyl group in the component (A), the component (C) is contained in an amount of 1,000 to 7,000 parts by mass in total, the component (D) is contained in an amount such that a number of the hydrogen atom bonded to a silicon atom (SiH group) in the component (D) is 0.01 to 3 per one alkenyl group in the component (A), the component (E) is contained in an amount of 1 to 200 ppm in mass of a platinum group metal relative to the component (A), and the component (F) is contained in an amount of 0.01 to 10 parts by mass, and
a thermal conductivity of each of the obtained first liquid and the second liquid is 2.0 to 7.0 W/m·K in a hot disk method according to ISO 22007-2, and a viscosity at 25° C. of each of the obtained first liquid and the second liquid is 30 to 800 Pa·s when measurement is performed at a rotation number of 10 rpm at shear rate 6 (1/sec) in a rotor A using a spiral viscometer.

According to the above-mentioned method for producing a two-part addition-curable silicone rubber composition, it is possible to provide a thermally-conductive two-part addition-curable silicone composition in which preservability is improved and change in hardness over time is suppressed. Additionally, the thermally-conductive addition-curable silicone that is a cured product of the thermally-conductive two-part addition-curable silicone composition can be suitably used to protect electrical and electronic components and circuit boards having these components mounted thereon, and therefore can exhibit the excellent stress relaxation property and thermal conductivity.

Furthermore, in the method for producing the thermally-conductive two-part addition-curable silicone composition, a total amount of the SiH groups in the component (B) and the component (D) is preferably in a ratio of 0.11 to 5 per one alkenyl group in the component (A).

According to such a production method, the obtained cured product is a stable silicone cured product, which is not too hard to become brittle.

Furthermore, the method for producing the thermally-conductive two-part addition-curable silicone composition preferably includes:
  mixing the mixture to be heat-treated in the first liquid and the mixture to be heat-treated in the second liquid with
    (G) a silane coupling agent and/or
    (H) an organopolysiloxane represented by the following general formula (4),

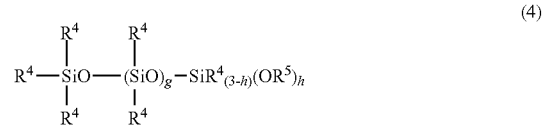

$$(4)$$

wherein each $R^4$ independently represents an unsubstituted or substituted monovalent hydrocarbon group, $R^5$ independently represents an alkyl group, an alkoxyalkyl group, an alkenyl group, or an acyl group, "g" represents an integer of 5 to 100, and "h" represents an integer of 1 to 3, the organopolysiloxane having a viscosity at 25° C. of 0.01 to 30 Pa·s; and performing heat treatment.

According to such method for producing the thermally-conductive two-part addition-curable silicone rubber composition, it is possible to obtain a thermally-conductive two-part addition-curable silicone composition in which the first liquid and the second liquids have a reduced viscosity.

Advantageous Effects of Invention

According to the present invention, it is possible to obtain a thermally-conductive two-part addition-curable silicone composition in which preservability is improved and change in hardness over time is suppressed. The thermally-conductive silicone that is a cured product of the thermally-conductive two-part addition-curable silicone composition can be suitably used to protect electrical and electronic components and circuit boards having these components mounted thereon, and therefore can exhibit an excellent stress relaxation property and thermal conductivity.

DESCRIPTION OF EMBODIMENTS

As a result of intensive studies to achieve the above-mentioned object, the inventors of the present invention have found that preservability can be improved and change in hardness over time can be suppressed by using a thermally-conductive two-part addition-curable silicone composition including a first liquid and a second liquid for a thermally-conductive filler. The first liquid is obtained by heat-treating and mixing aluminum oxide and an alkenyl group-containing organopolysiloxane at a temperature of 70° C. or more to obtain a mixture, the aluminum oxide having Na$^+$ ion content equal to or lower than 100 ppm, the Na$^+$ ion content being determined by measuring an aqueous layer by ion chromatography, the aqueous layer being heat extract from aluminum oxide powders with pure water at 120° C. for 48 hours, and subsequently adding to the mixture a curing catalyst and an ion-trapping agent of a cation-exchange type and/or a cation-and-anion-exchange type. The second liquid is obtained by simultaneously heat-treating and mixing aluminum oxide, an alkenyl group-containing organopolysiloxane, and an organohydrogenpolysiloxane having a specific structure at a temperature of 70° C. or more to obtain a mixture, the aluminum oxide having Na ion content equal to or lower than 100 ppm, the Na$^+$ ion content being determined by measuring an aqueous layer by ion chromatography, the aqueous layer being heat extract from aluminum oxide powders with pure water at 120° C. for 48 hours, and subsequently adding to the mixture an organohydrogenpolysiloxane having a specific structure. Thereby, the present invention was completed.

That is, the present invention is
a thermally-conductive two-part addition-curable silicone composition and a method for producing the same, the thermally-conductive two-part addition curable silicone composition including:
a first liquid and a second liquid,
the first liquid including:
a heat-treated mixture including
(A) an organopolysiloxane represented by the following average composition formula (1), $$R_aR^1_bSiO_{(4-a-b)/2} \qquad (1)$$

wherein R independently represents an alkenyl group, R$^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4, the organopolysiloxane having at least two alkenyl groups bonded to a silicon atom in one molecule, and (C) aluminum oxide having Na$^+$ ion content equal to or lower than 100 ppm, the Na$^+$ ion content being determined by measuring an aqueous layer by ion chromatography, the aqueous layer being heat extract from aluminum oxide powders with pure water at 120° C. for 48 hours,
the component (C) having been subjected to surface treatment with a part of the component (A);
(E) a platinum-group metal catalyst; and
(F) an ion-trapping agent of a cation-exchange type and/or a cation-and-anion-exchange type, carrying at least one element selected from Zr, Bi, Sb, Mg, and Al,
the second liquid including:
a heat-treated mixture including
(A) an organopolysiloxane represented by the following average composition formula (1), $$R_aR^1_bSiO_{(4-a-b)/2} \qquad (1)$$

wherein R independently represents an alkenyl group, R$^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4, the organopolysiloxane having at least two alkenyl groups bonded to a silicon atom in one molecule,
(B) an organohydrogenpolysiloxane represented by the following average composition formula (2), $$R^2_cH_dSiO_{(4-c-d)/2} \qquad (2)$$

wherein R$^2$ independently represents an unsubstituted or substituted monovalent hydrocarbon group having no aliphatic unsaturated bond, "c" represents 0.7 to 2.2, "d" represents 0.001 to 0.5, and "c+d" represents a positive number satisfying 0.8 to 2.5, the organohydrogenpolysiloxane having at least three hydrogen atoms bonded to a silicon atom in one molecule, and
(C) aluminum oxide having Na$^+$ ion content equal to or lower than 100 ppm, the Na$^+$ ion content being determined by measuring an aqueous layer by ion chromatography, the aqueous layer being heat extract from aluminum oxide powders with pure water at 120° C. for 48 hours, the component (C) having been subjected to surface treatment with a part of the component (B); and
(D) an organohydrogenpolysiloxane represented by the following average composition formula (3), $$R^3_eH_fSiO_{(4-e-f)/2} \qquad (3)$$

wherein R$^3$ independently represents an unsubstituted or substituted monovalent hydrocarbon group having no aliphatic unsaturated bond, "e" represents 0.7 to 2.2, "f" represents 0.001 to 0.5, and "e+f" represents a positive number satisfying 0.8 to 2.5, the organohydrogenpolysiloxane having at least two hydrogen atoms bonded to a silicon atom in one molecule,
in which the first liquid does not contain the components (B) and (D), and the second liquid does not contain the components (E) and (F),
in the composition, the component (A) is contained in an amount of 100 parts by mass in total, the component (B) is contained in an amount such that a number of the hydrogen atom bonded to a silicon atom (SiH group) in the component (B) is 0.1 to 2 per one alkenyl group in the component (A), the component (C) is contained in an amount of 1,000 to 7,000 parts by mass in total, the component (D) is contained in an amount such that a number of the hydrogen atom bonded to a silicon atom (SiH group) in the component (D) is 0.01 to 3 per one alkenyl group in the component (A), the component (E) is contained in an amount of 1 to 200 ppm in mass of a platinum group metal relative to the component (A), and the component (F) is contained in an amount of 0.01 to 10 parts by mass, and the first liquid and the second liquid each have a thermal conductivity of 2.0 to 7.0 W/m·K in a hot disk method according to ISO 22007-2, and the first liquid and the second liquid each have a viscosity at 25° C. of 30 to 800 Pa·s when measurement is performed at a rotation number of 10 rpm at shear rate 6 (1/sec) in a rotor A using a spiral viscometer.

Hereinafter, the present invention will be described in detail, but the present invention is not limited thereto.

Component (A):

The component (A) of the composition of the present invention is a component which is to be a main agent (base polymer) of the composition. The component (A) is an organopolysiloxane represented by the following average composition formula (1) and having at least two alkenyl groups bonded to a silicon atom (hereinafter, referred to as "silicon atom-bonded alkenyl groups") in one molecule. The number of silicon atom-bonded alkenyl groups is at least two in one molecule, preferably 2 to 50, and more preferably from 2 to 20. These silicon atom-bonded alkenyl groups may be bonded to a silicon atom at the end of the molecular chain, to a silicon atom at the non-terminal (i.e., other than the end of the molecular chain) of the molecular chain, or a combination thereof;

$$R_aR^1_bSiO_{(4-a-b)/2} \quad (1)$$

wherein R independently represents an alkenyl group, $R^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4.

In the above formula (1), R generally represents an alkenyl group having 2 to 6, and preferably 2 to 4 carbon atoms. Specific examples thereof include lower alkenyl groups such as a vinyl group, an allyl group, a propenyl group, an isopropenyl group, a butenyl group, and an isobutenyl group, and a vinyl group is particularly preferred.

$R^1$ generally represents an unsubstituted or substituted monovalent hydrocarbon group having no aliphatic unsaturated bond having 1 to 10, and preferably 1 to 6 carbon atoms. Examples thereof include alkyl groups such as a methyl group, an ethyl group, a propyl group, an isopropyl group, a butyl group, an isobutyl group, a tert-butyl group, a pentyl group, a hexyl group, a cyclohexyl group, an octyl group, and a decyl group; aryl groups such as a phenyl group and a tolyl group; aralkyl groups such as a benzyl group and a phenylethyl group; a chloromethyl group and a 3,3,3-trifluoropropyl group in which a part or all of hydrogen atoms in these groups are substituted with halogen atoms such as fluorine, chlorine, and bromine. In view of ease of synthesis, a methyl group, a phenyl group, and a 3,3,3-trifluoropropyl group are preferred.

Furthermore, "a" is a positive number of 0.0001 to 0.2, and preferably a positive number of 0.0005 to 0.1, "b" is a positive number of 1.7 to 2.2, and preferably a positive number of 1.9 to 2.0, and "a+b" is a positive number satisfying 1.9 to 2.4, and preferably a positive number satisfying 1.95 to 2.05.

The molecular structure of the organopolysiloxane of the component (A) is not particularly limited. The molecular structure may be any one of the following: a linear chain structure; a branched chain structure in which an $RSiO_{3/2}$ unit, $R^1SiO_{3/2}$ unit, or $SiO_2$ unit (wherein the groups represented by R and $R^1$ are as defined above) is contained at a part of the molecular chain; a cyclic structure; a three-dimensional network structure (resin structure); and a combination thereof. However, particularly preferred is a linear diorganopolysiloxane having a main chain basically composed of a diorganosiloxane repeating unit with both ends of the molecular chain being blocked with triorganosiloxy groups.

The viscosity of the organopolysiloxane of the component (A) is preferably 50 to 100,000 mPa·s, and more preferably 100 to 10,000 mPa·s. In the case where the viscosity is 50 to 100,000 mPa·s, the obtained cured product has more excellent strength, flowability, and workability. Note that the viscosity is a value at 25° C. measured by a rotational viscometer (the same shall apply hereinafter).

The organopolysiloxane of the component (A) satisfying the above requirement is, for example, the organopolysiloxane represented by the following general formula (1A):

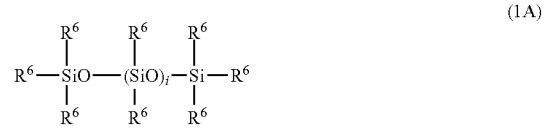

(1A)

wherein each $R^6$ independently represents an unsubstituted or substituted monovalent hydrocarbon group, provided that at least two of $R^6$ are alkenyl groups and "i" represents an integer of 20 to 2,000.

In this formula (1A), the unsubstituted or substituted monovalent hydrocarbon group represented by $R^6$ is the same as that defined in R (alkenyl group) and $R^1$ (unsubstituted or substituted monovalent hydrocarbon group having no aliphatic unsaturated bond) mentioned above, and the number of carbon atoms, specific examples, and the like are also the same. However, at least two, preferably 2 to 50, and more preferably 2 to 20 of $R^6$ are alkenyl groups. Furthermore, "i" is preferably an integer of 40 to 1,200, and more preferably an integer of 50 to 600.

Specific examples of the organopolysiloxane represented by the above formula (1A) include a dimethylpolysiloxane with both molecular chain ends blocked with dimethylvinylsiloxy groups, a dimethylsiloxane-methylvinylsiloxane copolymer with both molecular chain ends blocked with trimethylsiloxy groups, a dimethylsiloxane-methylvinylsiloxane copolymer with one molecular chain end blocked with a trimethylsiloxy group and another end blocked with a dimethylvinylsiloxy group, a dimethylsiloxane-methylvinylsiloxane copolymer with both molecular chain ends blocked with dimethylvinylsiloxy groups, and a dimethylsiloxane-diphenylsiloxane copolymer with both molecular chain ends blocked with dimethylvinylsiloxy groups.

As the organopolysiloxane of the component (A), one kind may be used alone, or two or more kinds may be used in combination.

The organopolysiloxane having alkenyl groups described above are known per se and are produced by conventionally known methods.

Note that the component (A) is used in both the first liquid and the second the second liquid, and the ratio of the component (A) used in the first liquid and the second liquid is not particularly limited. It is preferable to use the component (A) in such an amount that the mixing ratio between the first liquid and the second liquid is approximately equivalent mass ratio.

Component (B):

The component (B) of the composition of the present invention has at least three hydrogen atoms bonded to a silicon atom in one molecule and acts as a crosslinking agent and a surface treatment agent for aluminum oxide which is the component (C). That is, during heat-treatment at high temperature, the hydrogen atoms bonded to a silicon atom in the component (B) are partially consumed by a dehydrogenation reaction with Al—OH groups or residues of the surface treatment agent of an inorganic acid remaining on the surface of the component (C), and the remaining hydrogen atoms bonded to a silicon atom carry out an addition reaction with the alkenyl groups in the component (A). The component (B) is an essential component for the present invention.

The component (B) is an organohydrogenpolysiloxane represented by the following average composition formula (2) and having at least three hydrogen atoms bonded to a silicon atom (hereinafter also referred to as "silicon atom-bonded hydrogen atoms") in one molecule. The number of silicon atom-bonded hydrogen atoms in one molecule of this organohydrogenpolysiloxane is preferably 3 to 100, more preferably 3 to 50, and particularly preferably 3 to 20. The hydrogen atom bonded to the silicon atom may be at the end of the molecular chain, may be in the middle of the molecular chain, or may be in both of them;

$$R^2_c H_d SiO_{(4-c-d)/2} \quad (2)$$

wherein $R^2$ independently represents an unsubstituted or substituted monovalent hydrocarbon group having no aliphatic unsaturated bond, "c" represents 0.7 to 2.2, "d" represents 0.001 to 0.5, and "c+d" represents a positive number satisfying 0.8 to 2.5.

In the above formula (2), $R^2$ independently represents an unsubstituted or substituted monovalent hydrocarbon group having no aliphatic unsaturated bond, in which the number of carbon atoms is generally 1 to 10, and preferably 1 to 6. Specific examples thereof include alkyl groups such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; aryl groups such as a phenyl group, a tolyl group, a xylyl group, and a naphthyl group; aralkyl groups such as a benzyl group, a phenylethyl group, and a phenylpropyl group; and a 3,3,3-trifluoropropyl group and the like in which a part or all of the hydrogen atoms in these groups are substituted with halogen atoms such as fluorine, chlorine, and bromine. Among these, preferred are an alkyl group, an aryl group, and a 3,3,3-trifluoropropyl group, and more preferred are a methyl group, a phenyl group, and a 3,3,3-trifluoropropyl group.

Furthermore, "c" is a positive number of 0.7 to 2.2, and preferably a positive number of 1.0 to 2.1. "d" is a positive number of 0.001 to 0.5, and preferably a positive number of 0.005 to 0.1. "c+d" is a positive number satisfying 0.8 to 2.5, preferably a positive number satisfying 1.0 to 2.5, and more preferably a positive number satisfying 1.5 to 2.2.

The number of silicon atoms in one molecule of the organohydrogenpolysiloxane of the component (B) (i.e., degree of polymerization) is generally 10 to 1,000. In view of favorable handling workability of the composition and properties of the cured product to be obtained, the number is preferably 20 to 500, and more preferably 20 to 100.

Furthermore, the molecular structure of the organohydrogenpolysiloxane of the component (B) is not limited as long as the above requirements are satisfied.

The viscosity of the organohydrogenpolysiloxane of the component (B) is generally 1 to 10,000 mPa·s, preferably 3 to 2,000 mPa·s, and more preferably 10 to 1,000 mPa·s. The organohydrogenpolysiloxane is desirably in a liquid form at room temperature (25° C.).

Examples of the organohydrogenpolysiloxane represented by the above formula (2) include a methylhydrogensiloxane-dimethylsiloxane cyclic copolymer, a methylhydrogenpolysiloxane with both molecular chain ends blocked with dimethylhydrogensiloxy groups, a methylhydrogen-dimethylsiloxane copolymer with both molecular chain ends blocked with dimethylhydrogensiloxy groups, a methylhydrogen-diphenylsiloxane copolymer with both molecular chain ends blocked with dimethylhydrogensiloxy groups, a methylhydrogen-dimethylsiloxane-diphenylsiloxane copolymer with both molecular chain ends blocked with dimethylhydrogensiloxy groups, a methylhydrogenpolysiloxane with both molecular chain ends blocked with trimethylsiloxy groups, a dimethylsiloxane-methylhydrogensiloxane copolymer with both molecular chain ends blocked with trimethylsiloxy groups, a methylhydrogensiloxane-diphenylsiloxane copolymer with both molecular chain ends blocked with trimethylsiloxy groups, a methylhydrogensiloxane-diphenylsiloxane-dimethylsiloxane copolymer with both molecular chain ends blocked with trimethylsiloxy groups, a copolymer composed of a $(CH_3)_2 HSiO_{1/2}$ unit, a $(CH_3)_2 SiO$ unit, and a $CH_3 SiO_{3/2}$ unit, a copolymer composed of a $(CH_3)_2 HSiO_{1/2}$ unit, a $(C_6H_5)_2 SiO$ unit, a $(CH_3)_2 SiO$ unit, and a $CH_3 SiO_{3/2}$ unit, a copolymer composed of a $(CH_3)(C_6H_5) HSiO_{1/2}$ unit, a $(CH_3)_2 SiO$ unit, and a $CH_3 SiO_{3/2}$ unit, a copolymer composed of a $(CH_3)_2 HSiO_{1/2}$ unit, a $(CH_3)_2 SiO$ unit, and a $C_6H_5 SiO_{3/2}$ unit, a copolymer composed of a $(CH_3)(CF_3 C_2H_4) HSiO_{1/2}$ unit, a $(CH_3)(CF_3 C_2H_4) SiO$ unit, and a $CH_3 SiO_{3/2}$ unit, a copolymer composed of a $(CH_3)(CF_3 C_2H_4) HSiO_{1/2}$ unit, a $(CH_3)(CF_3 C_2H_4) SiO$ unit, a $(CH_3)_2 SiO$ unit, and a $CH_3 SiO_{3/2}$ units, a copolymer composed of a $(CH_3)_2 HSiO_{1/2}$ unit, a $(CH_3)(CF_3 C_2H_4) SiO$ unit, and a $CH_3 SiO_{3/2}$ unit, a copolymer composed of a $(CH_3)_2 HSiO_{1/2}$ unit, a $(CH_3)(CF_3 C_2H_4) SiO$ unit, a $(CH_3)_2 SiO$ unit, and a $CH_3 SiO_{3/2}$ unit, and a copolymer composed of a $(CH_3)_2 HSiO_{1/2}$ unit, a $(CH_3)(CF_3 C_2H_4) SiO$ unit, a $(CH_3)_2 SiO$ unit, and a $(CF_3 C_2H_4) SiO_{3/2}$ unit.

As the organohydrogenpolysiloxane of the component (B), one kind may be used alone or two or more kinds may be used in combination.

Furthermore, the organohydrogen polysiloxane is synthesized by a conventionally known method.

The organohydrogenpolysiloxane of the component (B) is blended in an amount such that the number of the hydrogen atoms bonded to a silicon atom (SiH group) in the component (B) per one alkenyl group in the total of the component (A) becomes 0.1 to 2, preferably 0.1 to 1.8, and more preferably 0.1 to 1.5. If the blended amount is too small, the effect of improving preservation stability may become insufficient. If the blended amount is too large, physical property of the obtained thermally-conductive silicone cured product may become unstable.

Component (C):

The component (C) of the composition of the present invention is aluminum oxide having $Na^+$ ion content equal to or lower than 100 ppm, the $Na^+$ ion content being determined by measuring an aqueous layer by ion chromatography, the aqueous layer being heat extract from aluminum oxide powders with pure water at 120° C. for 48 hours.

The Na$^+$ ion content is 100 ppm or lower, preferably 80 ppm or lower, and more preferably 60 ppm or lower, the Na$^+$ ion content being determined by measuring an aqueous layer by ion chromatography, the aqueous layer being heat extract from aluminum oxide powders with pure water at 120° C. for 48 hours. If the Na$^+$ ion content exceeds 100 ppm, the component (E) may be deactivated over time. The lower limit of the Na$^+$ ion content may be 0 ppm or higher.

Here, in order to make the Na$^+$ ion content of the aluminum oxide used in the present invention fall within the above range, the Na$^+$ ion content may be adjusted by dispersing commercially-available aluminum oxide powders in water, and stirring at normal temperature (1 to 25° C.), or, for shortening the process time, while heating to 60° C., for example, to wash with water.

The aluminum oxide powders preferably have an average particle diameter measured by a laser diffraction method of 1 to 100 μm, more preferably 1 to 80 μm. Furthermore, the particles preferably have crushed shapes, rounded shapes, or spherical shapes, and the crushed shape and the spherical shape are preferred. As the aluminum oxide powders, one kind may be used alone or a plurality of two or more kinds having different average particle diameters may be used in combination. If the average particle diameter is 1 μm or larger, contact between particles is sufficient to provide favorable thermal conductivity without increasing interparticle contact thermal resistance. Furthermore, if the average particle diameter is 100 μm or less, irregularities of a sheet surface are sufficiently small to provide favorable thermal conductivity without increasing interfacial thermal resistance.

The thermally-conductive filler of the component (C) is contained in an amount of 1,000 to 7,000 parts by mass, preferably 1,000 to 6,900 parts by mass, and more preferably 1,000 to 6,700 parts by mass, in total, per 100 parts by mass of the total of the component (A). When the blended amount is within the above range, it is possible to provide a thermally-conductive two-part addition-curable silicone composition that provides a thermally-conductive silicone cured product of the present invention in which change in the viscosity, thermal conductivity, and preservability can be suppressed, and change in hardness over time can be suppressed.

Note that the component (C) is used in both the first liquid and the second liquid, and the ratio of the component (C) used in the first liquid and the second liquid is not particularly limited. It is preferable to use the component (C) in such a way that the mixing ratio of the first liquid and the second liquid is also most equal in mass ratio.

Component (D):

The component (D) of the composition of the present invention is an organohydrogenpolysiloxane represented by the following average composition formula (3),

$$R^3{}_eH_fSiO_{(4-e-f)/2} \quad (3)$$

wherein R$^3$ independently represents an unsubstituted or substituted monovalent hydrocarbon group having no aliphatic unsaturated bond, and "e" represents 0.7 to 2.2, "f" represents 0.001 to 0.5, and "e+f" represents a positive number satisfying 0.8 to 2.5, the organohydrogenpolysiloxane having two hydrogen atoms bonded to a silicon atom in one molecule.

In the above formula (3), R$^3$ independently represents an unsubstituted or substituted monovalent hydrocarbon group having no aliphatic unsaturated bond, the number of carbon atoms of which is generally 1 to 10, and preferably 1 to 6. Specific examples thereof include alkyl groups such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; aryl groups such as a phenyl group, a tolyl group, a xylyl group, and a naphthyl group; aralkyl groups such as a benzyl group, a phenylethyl group, and a phenylpropyl group; a 3,3,3-trifluoropropyl group and the like in which a part or all of the hydrogen atoms in these groups are substituted with halogen atoms such as fluorine, chlorine, and bromine. Among these, preferred are an alkyl group, an aryl group, and a 3,3,3-trifluoropropyl group, and more preferred are a methyl group, a phenyl group, and a 3,3,3-trifluoropropyl group.

Furthermore, "e" is a positive number of 0.7 to 2.2, and preferably a positive number of 1.0 to 2.1. "f" is a positive number of 0.001 to 0.5, and preferably a positive number of 0.005 to 0.1. "e+f" is a positive number satisfying 0.8 to 2.5, preferably a positive number satisfying 1.0 to 2.5, and more preferably a positive number satisfying 1.5 to 2.2.

The organohydrogenpolysiloxane of the component (D) has two hydrogen atoms bonded to a silicon atom in one molecule. The two hydrogen atoms may be at the end of the molecular chain, in the middle of the molecular chain, or one at the end of the molecular chain and the other in the middle of the molecular chain. Preferably, the hydrogen atoms are at the end of the molecular chain.

The number of silicon atoms in one molecule of the organohydrogenpolysiloxane of the component (D) (i.e., degree of polymerization) is generally 10 to 1,000. In view of obtaining favorable handling workability of the composition and properties of the cured product to be obtained, the number is preferably 15 to 500, and more preferably 18 to 100.

Furthermore, the molecular structure of the organohydrogenpolysiloxane of the component (D) is not limited as long as the above requirements are satisfied.

The viscosity of the organohydrogenpolysiloxane of the component (D) is generally 1 to 10,000 mPa·s, preferably 3 to 2,000 mPa·s, and more preferably 10 to 1,000 mPa·s. The organohydrogenpolysiloxane is desirably in a liquid form at room temperature (25° C.).

Examples of the organohydrogenpolysiloxane represented by the above formula (3) include a methylhydrogensiloxane-dimethylsiloxane cyclic copolymer, a dimethylpolysiloxane with both molecular chain ends blocked with dimethylhydrogensiloxy groups, a methylhydrogenpolysiloxane with both molecular chain ends blocked with trimethylsiloxy groups, a dimethylsiloxane-methylhydrogensiloxane copolymer with both molecular chain ends blocked with trimethylsiloxy groups, a methylhydrogensiloxane-diphenylsiloxane copolymer with both molecular chain ends blocked with trimethylsiloxy groups, a methylhydrogensiloxane-diphenylsiloxane-dimethylsiloxane copolymer with both molecular chain ends blocked with trimethylsiloxy groups, a copolymer composed of a (CH$_3$)$_2$HSiO$_{1/2}$ unit, a (CH$_3$)$_2$SiO unit, and a CH$_3$SiO$_{3/2}$ unit, a copolymer composed of a (CH$_3$)$_2$HSiO$_{1/2}$ unit, a (C$_6$H$_5$)$_2$SiO unit, a (CH$_3$)$_2$SiO unit, and a CH$_3$SiO$_3$/2 unit, a copolymer composed of a (CH$_3$)(C$_6$H$_5$)HSiO$_{1/2}$ unit, a (CH$_3$)$_2$SiO unit, and a CH$_3$SiO$_{3/2}$ unit, a copolymer composed of a (CH$_3$)$_2$HSiO$_{1/2}$ unit, a (CH$_3$)$_2$SiO unit, and a C$_6$H$_5$SiO$_{3/2}$ unit, a copolymer composed of a (CH$_3$)(CF$_3$C$_2$H$_4$)HSiO$_{1/2}$ unit, a (CH$_3$)(CF$_3$C$_2$H$_4$)SiO unit, and a CH$_3$SiO$_{3/2}$ unit, a copolymer composed of a (CH$_3$)(CF$_3$C$_2$H$_4$)HSiO$_{1/2}$ unit, a (CH$_3$) (CF$_3$C$_2$H$_4$) SiO unit, a (CH$_3$) 2SiO unit, and a CH$_3$SiO$_{3/2}$ unit, a copolymer composed of a (CH$_3$)$_2$HSiO$_{1/2}$ unit, a (CH$_3$) (CF$_3$C$_2$H$_4$) SiO unit, and a CH$_3$SiO$_{3/2}$ unit, a copolymer composed of a (CH$_3$)$_2$HSiO$_{1/2}$ unit, a (CH$_3$) (CF$_3$C$_2$H$_4$) SiO unit, a (CH$_3$)$_2$SiO unit, and a CH$_3$SiO$_3$/2 unit, a copolymer composed of a (CH$_3$)$_2$HSiO$_{1/2}$ unit, a (CH$_3$) (CF$_3$C$_2$H$_4$)SiO unit, a (CH$_3$)$_2$SiO unit, and a (CF$_3$C$_2$H$_4$)SiO$_{3/2}$ unit.

As the organohydrogenpolysiloxanes of the component (D), one kind may be used alone or two or more kinds may be used in combination.

Furthermore, the organohydrogenpolysiloxane is synthesized by a conventionally known method.

Here, the component (D) has two hydrogen atoms bonded to a silicon atom (SiH groups) in one molecule, and differs in this respect from the component (B) having at least three hydrogen atoms bonded to a silicon atom in one molecule. Furthermore, the component (B) is also used as a surface treatment agent for the component (C), whereas the component (D) is used only as a crosslinking agent to react with an alkenyl group in the component (A) to obtain a cured product. That is, because the component (D) has two SiH groups, if even one of them is deactivated, three-dimensional crosslinking fails to occur. Accordingly, in the present invention, the component (C) is surface-treated with the above-mentioned component (B) so that the component (D) to be blended in the second liquid does not deteriorate over time.

Therefore, the component (D) is used in an amount such that the number of the SiH groups in the component (D) becomes 0.01 to 3, preferably 0.05 to 2, and more preferably 0.2 to 1.5 per one alkenyl group in the total of the component (A). When the number of the SiH groups in the component (D) is lower than 0.01 per one alkenyl group in the component (A), the resultant may become too soft and a stable silicone cured product may not be obtained. When the number of the SiH groups in the component (D) exceeds three per one alkenyl group in the component (A), the silicone cured product may become too hard and become brittle.

In the present invention, it is preferable that the total amount of the SiH groups in the above-mentioned components (B) and (D) be in a ratio of 0.11 to 5, particularly 0.25 to 4 per one alkenyl group in the total of the component (A). If the total amount of SiH groups in the component (B) and the component (D) is 0.11 or more per one alkenyl group in the component (A), a stable silicon cured product which is not too soft can be obtained. If the total amount of SiH groups in the component (B) and the component (D) is 5 or less per one alkenyl group in the component (A), the silicone cured product is flexible enough and not brittle.

Component (E):

The component (E) of the composition of the present invention is a platinum-group metal catalyst, which is a catalyst for promoting an addition reaction between the alkenyl group in the component (A) and the hydrogen atoms bonded to a silicon atom in the components (B) and (D). For example, chloroplatinic acid, alcohol-modified chloroplatinic acid, coordination compounds of chloroplatinic acid with olefins, aldehydes, vinylsiloxanes, or an acetylene compound, tetrakis(triphenylphosphine)palladium, chlorotris(triphenylphosphine)rhodium, or the like are used. Preferably used is a platinum catalyst, and most suitably used is a coordination compound of chloroplatinic acid and vinylsiloxane.

The blended amount of the component (E) may be a catalytic amount, and is generally 1 to 200 ppm, preferably 2 to 100 ppm in terms of mass of platinum group metals relative to the total of the component (A). If the blended amount of the component (E) is out of this range, suitable curability cannot be obtained.

Component (F):

The component (F) is an ion-trapping agent of a cation-exchange type and/or a cation-and-anion-exchange type, which can suppress degradation over time of the component (E) due to Na$^+$ ion contained in the component (C) in the composition of the present invention. Therefore, the anion-exchange type trapping agent is not suitable in the present invention.

The component (F) carries at least one element selected from Zr, Bi, Sb, Mg, and Al. Preferably, the element is selected from Zr, Bi, Mg, and Al, and more preferably selected from Zr, Mg, and Al.

The component (F) is not limited in other respects, but the carrier is preferably one or two or more kinds selected from inorganic ion exchangers such as hydrotalcites and polyvalent metal acid salts. Among these, it is particularly preferable that the component (F) include hydrotalcite carries in view of improving the preservation property of the composition of the present invention.

The amount of elements carried by the component (F) is preferably 0.1 to 10 meq/g, and particularly preferably 1 to 8 meq/g as the total exchange amount of each ion. Within this range, the preservation property of the composition of the present invention can be improved more effectively. Note that the total exchange amount of ions is an ion exchange amount in 0.1N hydrochloric acid or a 0.1N sodium hydroxide aqueous solution.

For the component (F), for example, commercially-available products such as IXE-100, IXE-600, IXEPLAS-A1, and IXEPLAS-A2 (manufactured by Toagosei Co., Ltd.) can be used.

The amount of the component (F) added is 0.01 to 10 parts by mass, preferably 0.1 to 10 parts by mass, and more preferably 0.5 to 10 parts by mass relative to 100 parts by mass in total of the component (A). If the component (F) is less than 0.01 parts by mass, aging degradation of the component (E) may not be suppressed, and if the component (F) exceeds 10 parts by mass, suitable curability may not be achieved.

Component (G):

For the composition of the present invention, (G) a silane coupling agent can be used if necessary. Blending the component (G) provides an effect of reducing the viscosity of the first liquid and the second liquid. Examples of (G) the silane coupling agent include a vinyl silane coupling agent, an epoxy silane coupling agent, an acrylic silane coupling agent, and a long-chain alkyl silane coupling agent. One kind may be used alone or two or more kinds may be used in combination as appropriate. Among these, the long-chain alkyl silane coupling agent is preferred, and decyltrimethoxysilane is more preferred.

In the case where the component (G) is mixed in the present invention, it is preferable to make a heat-treated mixture at a temperature of 70° C. or higher together with the components (A) and (C), or the components (A) to (C) mentioned above. It is also possible to pretreat the component (C) with the component (G). In this case, the surface treatment method of the component (C) with the component (G) includes a spray method using a fluid nozzle, an agitation method with a sharing force, a dry method such as using a ball mill or a mixer, and a wet method such as an aqueous or organic solvent-based method. The agitation is carried out to the extent that no destruction of the spherical aluminum oxide powders is caused. The temperature in the system and the drying temperature after treatment in the dry method depend on the type of the surface treatment agent and are appropriately determined within the range where the surface treatment agent does not volatilize or decompose, and may be between 80 to 180° C.

When using the component (G), the blended amount thereof is preferably 0.1 to 5 parts by mass, and more preferably 1 to 5 parts by mass relative to 100 parts by mass in total of the component (C). When the amount is 0.1 parts by mass or more, the effect of reducing the viscosity can be sufficiently obtained, and when the amount is 5 parts by mass or less, a suitable effect for the amount used can be obtained.

Note that, when used, the component (G) is contained in both the first liquid and the second liquid, and the ratio of the component (G) contained in the first liquid and the second liquid is not particularly limited. For example, the component (G) may be blended in the first liquid and the second liquid in the same amount.

Component (H):

The composition of the present invention contains (H) an organopolysiloxane represented by the following general formula (4), containing at least one hydrolyzable silyl group in one molecule, and having a viscosity at 25° C. of 0.01 to 30 Pa·s. Blending of the component (H) provides an effect of reducing the viscosity of the first liquid and the second liquid;

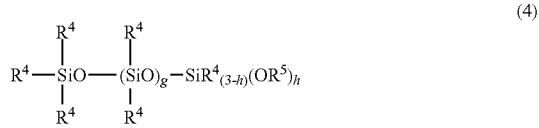

(4)

wherein each $R_4$ independently represents an unsubstituted or substituted monovalent hydrocarbon group, $R^5$ independently represents an alkyl group, an alkoxyalkyl group, an alkenyl group, or an acyl group, "g" represents an integer of 5 to 100, and "h" represents an integer of 1 to 3.

In the above formula (4), $R^4$ independently represents an unsubstituted or substituted monovalent hydrocarbon group having preferably 1 to 10, more preferably 1 to 6, and still more preferably 1 to 3 carbon atoms. Examples thereof include a linear alkyl group, a branched alkyl group, a cyclic alkyl group, an alkenyl group, an aryl group, an aralkyl group, and an alkyl halide group. Examples of the linear alkyl group include a methyl group, an ethyl group, a propyl group, a hexyl group, an octyl group, and a decyl group. Examples of the branched alkyl group include an isopropyl group, an isobutyl group, a tert-butyl group, and a 2-ethylhexyl group. Examples of the cyclic alkyl group include a cyclopentyl group, and a cyclohexyl group. Examples of the alkenyl group include a vinyl group and an allyl group. Examples of the aryl group include a phenyl group and a tolyl group. Examples of the aralkyl group include a 2-phenylethyl group, and a 2-methyl-2-phenylethyl group. Examples of the alkyl halide group include a 3,3,3-trifluoropropyl group, a 2-(nonafluorobutyl)ethyl group, and a 2-(heptadecafluorooctyl)ethyl group. Preferred as $R^4$ are a methyl group and a phenyl group.

In the above formula (4), $R^5$ independently represents an alkyl group, an alkoxyalkyl group, an alkenyl group, or an acyl group. Examples of the alkyl group include a linear alkyl group, a branched alkyl group, and a cyclic alkyl group similar to those exemplified in $R^4$. Examples of the alkoxyalkyl group include a methoxyethyl group, and a methoxypropyl group, and those having 2 to 10 carbon atoms are preferred. Examples of the alkenyl group include the same ones exemplified in the above-mentioned R, and those having 2 to 8 carbon atoms are preferred. Examples of the acyl group include an acetyl group, and an octanoyl group, and those having 2 to 10 carbon atoms are preferred. $R^5$ is preferably an alkyl group, and particularly preferably a methyl group or an ethyl group.

Furthermore, "g" is an integer of 5 to 100, preferably an integer of 8 to 50, and "h" is an integer of 1 to 3, preferably 3.

Suitable specific examples of the organopolysiloxane of the component (H) include the following:

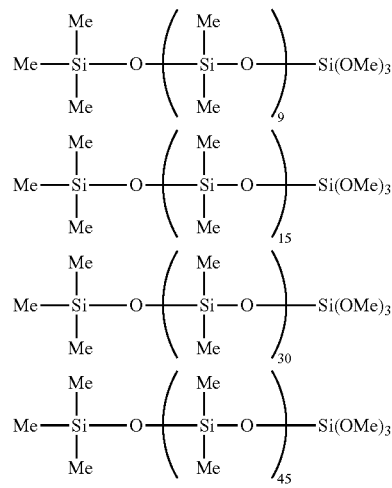

wherein Me is a methyl group, and the same shall apply hereinafter.

The viscosity at 25° C. of the organopolysiloxane of the component (H) is generally 0.01 to 30 Pa·s, preferably 0.01 to 10 Pa·s. If the viscosity is 0.01 Pa·s or more, oil bleeding of the component (H) from the silicone composition becomes less likely to occur. If the viscosity is 30 Pa·s or less, the obtained silicone composition has excellent flowability and favorable application workability.

When using the component (H), the blended amount thereof is preferably 5 to 900 parts by mass, more preferably 10 to 900 parts by mass, and still more preferably 15 to 700 parts by mass relative to 100 parts by mass in total of the component (A). If the blended amount of the component (H) is 5 parts by mass or more, the effect of reducing the viscosity can be sufficiently obtained, and if the amount is 900 parts by mass or less, there is no fear that the oil bleeding of the component (H) from the silicone composition occurs.

Note that, when used, the component (H) is contained in both the first liquid and the second liquid, and the ratio of the component (H) contained in the first liquid and the second liquid is not particularly limited. For example, the component (H) may be blended in the first liquid and the second liquid in the same amount.

Note that, in the case of blending the component (H), it is preferable that the component (H) be blended together with the components (A) and (C), or the components (A) to (C) mentioned above, and then subjected to heat treatment at a temperature of 70° C. or higher to produce a cooled heat-treated mixture, followed by blending the component (E), the component (F), or the component (D).

To the composition of the present invention, various additives known per se and other than the components (A) to (H) can be blended as other blending agents.

Examples of the additive which can be blended include: reaction control agents for adjusting curing speed and preservation stability, specifically including triallyl isocyanate, alkyl maleate, acetylene alcohols such as ethynylcyclohexanol, or the like and silanes or modified siloxanes thereof, hydroperoxide, tetramethylethylenediamine, and benzotriazole; a coloring agent such as ferrous oxide, ferric oxide, or the like used alone or in combination thereof; and a thixotropy-imparting agent such as fumed silica. The amount of each of these additives blended in the present composition is preferably 0.01 to 100,000 ppm in terms of mass.

Thermally-Conductive Two-Part Addition-Curable Silicone Composition

The composition of the present invention is a thermally-conductive two-part addition-curable silicone composition including a first liquid and a second liquid containing the above components (A) to (F) and, if necessary, the above components (G) and (H) and other components.

Here, the first liquid contains a mixture of the components (A) and (C) and, if necessary, the components (G) and (H), the mixture being heat-treated at a temperature of 70° C. or higher, and does not contain the components (B) and (D). The second liquid contains a mixture of the components (A), (B), and (C) and, if necessary, the components (G) and (H), the mixture being heat-treated at a temperature of 70° C. or higher, the component (D), and other additives if necessary, and does not contain the components (E) and (F).

First Liquid

The first liquid contains a mixture of the components (A) and (C), the component (E) and the component (F), but does not contain the components (B) and (D). The mixture is heat-treated at a temperature of 70° C. or higher, and further may contain, if necessary, the components (G) and (H).

To prepare the heat-treated mixture, the above components (A) and (C) and, if necessary, the components (G) and (H) are heated at 70° C. or higher, preferably 100 to 200° C., more preferably 100 to 170° C., still more preferably 100 to 160° C., and particularly preferably 100 to 150° C., and are mixed preferably for 60 minutes or more. Although there is no particular limitation on the upper limit of the heat treatment time, the components are heated for preferably 60 to 240 minutes, more preferably 60 to 180 minutes, and particularly preferably 60 to 120 minutes. If the heat treatment temperature is less than 70° C., the surface treatment of the component (C) with the component (A) may be insufficient. If the heat treatment temperature is 200° C. or lower, the components (A), (G), and (H) do not decompose. Furthermore, if the heat treatment time is sufficiently long, the surface treatment of the component (C) with the component (A) is sufficient.

The heat-treated mixture obtained above by mixing the components (A) and (C) and, if necessary, the components (G) and (H) and heating the components at 70° C. or higher is cooled to preferably 0 to 50° C., more preferably to normal temperature (1 to 25° C.). Then, to the cooled mixture, the components (E) and (F) are added and uniformly mixed. Here, mixing conditions of the heat-treated mixture with the components (E) and (F) are about 5 to 30 minutes at normal temperature (1 to 25° C.) The first liquid can be obtained by the method described above.

Second Liquid

The second liquid contains a mixture of the components (A), (B), and (C), and the component (D), and further may contain other additives, if necessary, but does not contain the components (E) and (F). The mixture is heat-treated at a temperature of 70° C. or higher, and further may contain, if necessary, the components (G) and (H).

To prepare the heat-treated mixture, the above components (A), (B), and (C) and, if necessary, the components (G) and (H) are heated at 70° C. or higher, preferably 100 to 200° C., more preferably 100 to 170° C., still more preferably 100 to 160° C., and particularly preferably 100 to 150° C., and are mixed preferably for 60 minutes or more. Although there is no particular limitation on the upper limit of the heat treatment time, the components are heated for preferably 60 to 240 minutes, more preferably 60 to 180 minutes, and particularly preferably 60 to 120 minutes. If the heat treatment temperature is less than 70° C., the reaction between hydrogen atoms bonded to a silicon atom in the component (B) and reactive groups such as Al—OH groups or reactive substances such as residual inorganic acids in the component (C) that may degrade preservation stability proceeds slowly. If the heat treatment temperature is 200° C. or lower, the polymers themselves of the components (A) and (B) are not deteriorated. If the heat treatment time is sufficiently long, the reaction between hydrogen atoms bonded to a silicon atom in the component (B) and reactive groups such as Al—OH groups or reactive substances such as residual inorganic acids in the component (C) that may degrade preservation stability sufficiently proceeds, and the effect of improving the preservation stability becomes sufficient.

The heat-treated mixture obtained above by mixing and heating at 70° C. or higher the components (A), (B), and (C) and, if necessary, the components (G) and (H) is cooled to preferably 0 to 50° C., and more preferably to normal temperature (1 to 25° C.). Then, to the cooled components, the components (D) and, if necessary, other additives are added and uniformly mixed. Here, mixing conditions of the heat-treated mixture with the component (D) and, if necessary, other additives are about 5 to 30 minutes at normal temperature (1 to 25° C.) The second liquid can be obtained by the method described above.

As a mixing apparatus used in preparation of the above first liquid and the second liquids, it is possible to use a known mixer such as a static mixer, a planetary mixer, or a paddle mixer.

In the composition of the present invention, the thermal conductivity of each of the first liquid and the second liquid is 2.0 to 7.0 W/m·K, preferably 2.2 to 7.0 W/m·K in the hot disc method according to ISO 22007-2. If the thermal conductivity is too low, the heat dissipation performance of heat-generating electronic components may be insufficient. In the present invention, particularly, the above range of the thermal conductivity can be achieved by setting the blending amount of the component (C) within the range specified above.

In the composition of the present invention, the viscosity at 25° C. of each of the first liquid and the second liquid measured at a rotation number of 10 rpm at shear rate 6 (1/sec) in a Rotor A using a spiral viscometer is 30 to 800 Pa·s, preferably 30 to 700 Pa·s. If the viscosity is too low, the shape retainability of the present composition may become insufficient, and if the viscosity is too high, difficulty may arise in terms of workability. In the present invention, the viscosity in the above-mentioned range can be achieved by setting particularly the amount of the component (C) within the range specified above.

In the composition of the present invention, if the first liquid and the second liquid have a small difference in viscosity, the liquids can be mixed uniformly by a motionless mixer such as a static mixer. In this case, when measurement is performed at a rotation number of 10 rpm at shear rate of 6(1/sec) in a Rotor A using a spiral viscometer, a difference in viscosity at 25° C. in an initial stage (during preparation) between the first liquid and the second liquid is preferably ±0 to 80%, and particularly preferably ±0 to 50% based on the viscosity of the first liquid.

In the composition of the present invention, the mixing ratio of the first liquid and the second liquid is preferably approximately equal in mass ratio. Specifically, the first liquid and the second liquid are mixed at a mass ratio of desirably approximately 1:0.5 to 1:2, particularly desirably 1:0.75 to 1:1.25, further desirably 1:0.9 to 1:1.1, and notably desirably 1:0.95 to 1:1.05.

In the composition of the present invention, the mixing apparatus for the first liquid and the second liquid is not limited to a motionless mixer such as a static mixer, and may be a known mixer such as a planetary mixer or a paddle mixer.

The curing conditions of the composition of the present invention is not particularly limited, and may be the same as curing conditions of a known addition reaction-curable silicone composition. For example, the composition is cured sufficiently at normal temperature, but may be heated if necessary. Curing conditions when heating is performed may be at 40 to 180° C. for 1 to 60 minutes.

The obtained cured product of the composition of the present invention preferably shows, in a Shore 00 hardness tester specified by ASTM D 2240-05, hardness within the range of 5 to 95, particularly preferably 10 to 90.

Method for Producing Composition

Furthermore, the present invention provides a method for producing a thermally-conductive two-part addition-curable silicone composition to prepare a composition including a first liquid and a second liquid, the method including a process of preparing the first liquid and a process of preparing the second liquid, in which the process of preparing the first liquid includes:
performing heat treatment at a temperature of 70° C. or more to a mixture including
(A) an organopolysiloxane represented by the following average composition formula (1), $$R_a R^1_b SiO_{(4-a-b)/2} \tag{1}$$

wherein R independently represents an alkenyl group, $R^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4, the organopolysiloxane having at least two alkenyl groups bonded to a silicon atom in one molecule, and
(C) aluminum oxide having $Na^+$ ion content equal to or lower than 100 ppm, the $Na^+$ ion content being determined by measuring an aqueous layer by ion chromatography, the aqueous layer being heat extract from aluminum oxide powders with pure water at 120° C. for 48 hours,
to perform surface treatment of the component (C) with a part of the component (A), and subsequently adding and mixing to the cooled heat-treated mixture
(E) a platinum-group metal catalyst, and
(F) an ion-trapping agent of a cation-exchange type and/or a cation-and-anion-exchange type carrying at least one element selected from Zr, Bi, Sb, Mg, and Al; and the process of preparing the second liquid includes:
performing heat treatment at a temperature of 70° C. or more to a mixture including
(A) an organopolysiloxane represented by the following average composition formula (1), $$R_a R^1_b SiO_{(4-a-b)/2} \tag{1}$$

wherein R independently represents an alkenyl group, $R^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4, the organopolysiloxane having at least two alkenyl groups bonded to a silicon atom in one molecule, and
(B) an organohydrogenpolysiloxane represented by the following average composition formula (2), $$R^2_c H_d SiO_{(4-c-d)/2} \tag{2}$$

wherein $R^2$ independently represents an unsubstituted or substituted monovalent hydrocarbon group having no aliphatic unsaturated bond, "c" represents 0.7 to 2.2, "d" represents 0.001 to 0.5, and "c+d" represents a positive number satisfying 0.8 to 2.5, the organohydrogenpolysiloxane having at least three hydrogen atoms bonded to a silicon atom in one molecule, and
(C) aluminum oxide having N ion content equal to or lower than 100 ppm, the $Na^+$ ion content being determined by measuring an aqueous layer by ion chromatography, the aqueous layer being heat extract from aluminum oxide powders with pure water at 120° C. for 48 hours,
to perform surface treatment of the component (C) with a part of the component (B), and subsequently adding and mixing to the cooled heat-treated mixture
(D) an organohydrogenpolysiloxane represented by the following average composition formula (3), $$R^3_e H_f SiO_{(4-e-f)/2} \tag{3}$$

wherein $R^3$ independently represents an unsubstituted or substituted monovalent hydrocarbon group having no aliphatic unsaturated bond, "e" represents 0.7 to 2.2, "f" represents 0.001 to 0.5, and "e+f" represents a positive number satisfying 0.8 to 2.5, the organohydrogenpolysiloxane having at least two hydrogen atoms bonded to a silicon atom in one molecule,
in which the first liquid does not contain the components (B) and (D), and the second liquid does not contain the components (E) and (F),
in the composition, the component (A) is contained in an amount of 100 parts by mass in total, the component (B) is contained in an amount such that a number of the hydrogen atom bonded to a silicon atom (SiH group) in the component (B) is 0.1 to 2 per one alkenyl group in the component (A), the component (C) is contained in an amount of 1,000 to 7,000 parts by mass in total, the component (D) is contained in an amount such that a number of the hydrogen atom bonded to a silicon atom (SiH group) in the component (D) is 0.01 to 3 per one alkenyl group in the component (A), the component (E) is contained in an amount of 1 to 200 ppm in mass of a platinum group metal relative to the component (A), and the component (F) is contained in an amount of 0.01 to 10 parts by mass, and
a thermal conductivity of each of the obtained first liquid and the second liquid is 2.0 to 7.0 W/m·K in a hot disk method according to ISO 22007-2, and a viscosity at 25° C. of each of the obtained first liquid and the second liquid is 30 to 800 Pa·s when measurement is performed at a rotation number of 10 rpm at shear rate 6 (1/sec) in a rotor A using a spiral viscometer.

According to the above-mentioned method for producing a two-part addition-curable silicone rubber composition, it is possible to obtain a thermally-conductive two-part addition-curable silicone composition in which the preservability is improved and change in hardness over time is suppressed. The thermally-conductive two-part addition silicone that is a cured product of the thermally-conductive two-part addition-curable silicone composition can be suitably used to protect electrical and electronic components and circuit boards having these components mounted thereon, and therefore can exhibit an excellent stress relaxation property and thermal conductivity.

Furthermore, in the method for producing a thermally-conductive two-part addition-curable silicone component, the total amount of the SiH groups in the component (B) and the component (D) is preferably in a ratio of 0.11 to 5 per one alkenyl group in the component (A).

According to such production method, the obtained cured product is a stable silicone cured product having sufficient hardness, and does not become too hard and become brittle.

Furthermore, in the method for producing a thermally-conductive two-part addition-curable silicone component, it is preferable that the mixture to be heat-treated in the first liquid and the mixture to be heat-treated in the second liquid be mixed with (G) a silane coupling agent and/or (H) the organopolysiloxane having a viscosity at 25° C. of 0.01 to 30 Pa·s mentioned above and be heat-treated.

According to such method for producing the addition-curable silicone rubber composition, it is possible to provide an effect of reducing the viscosity of the first liquid and the second liquid.

The components (A) to (H) and the other blending agents can be added and mixed as described above.

EXAMPLE

Hereinafter, the present invention will be specifically described by showing Examples and Comparative Examples. However, the present invention is not limited to the following Examples. In the examples below, Vi represents a vinyl group.

Example 1

In a 5 L planetary mixer manufactured by INOUE MFG., INC., the following were added and mixed, and subjected to heat treatment and mixing for one hour at 100° C.: (A) 55.2 parts by mass of dimethylpolysiloxane with both molecular chain ends blocked with dimethylvinylsiloxy groups having a viscosity of 600 mPa·s; (H) 9 parts by mass of organopolysiloxane represented by the following general formula (6) and having a viscosity at 25° C. of 30 mPa·s; (C) 300 parts by mass of fused spherical aluminum oxide A having Na$^+$ ion content of 57 ppm and an average particle diameter of 43 μm, the Na$^+$ ion content being determined by measuring an aqueous layer by ion chromatography, the aqueous layer being heat extract from aluminum oxide powders with pure water at 120° C. for 48 hours; and (C) 200 parts by mass of crushed aluminum oxide B having Na$^+$ ion content of 11 ppm and an average particle diameter of 1.2 μm, the Na$^+$ ion content being determined by measuring an aqueous layer by ion chromatography, the aqueous layer being heat extract from aluminum oxide powders with pure water at 120° C. for 48 hours.

Subsequently, the heat-treated mixture was sufficiently cooled to room temperature (25° C.), and then the cooled mixture, (E) 0.18 parts by mass of vinylsiloxane complex of chloroplatinic acid (Pt content of 1 mass %), and (F) 1.00 part by mass of a cation-and-anion-exchange type ion-trapping agent IXEPLAS-A1 (manufactured by Toagosei Co., Ltd.) were uniformly mixed at room temperature (25° C.) for 20 minutes to obtain a first liquid of a thermally-conductive addition-curable silicone composition 1.

In a 5 L planetary mixer manufactured by INOUE MFG., INC., the following were added and mixed, and subjected to heat treatment and mixing for one hour at 100° C.: (A) 44.8 parts by mass of dimethylpolysiloxane with both molecular chain ends blocked with dimethylvinylsiloxy groups having a viscosity of 600 mPa·s; (B) 1.26 parts by mass of methylhydrogen-dimethylpolysiloxane blocked with trimethylsiloxy groups represented by the following general formula (5) and having a viscosity at 25° C. of 28 mPa·s (SiH groups in a polysiloxane of the formula (5)/total SiVi groups in dimethylpolysiloxane with both molecular chain ends blocked with dimethylvinylsiloxy groups=0.11); (H) 9 parts by mass of organopolysiloxane represented by the following general formula (6) and having a viscosity at 25° C. of 30 mPa·s; (C) 300 parts by mass of fused spherical aluminum oxide A having Na$^+$ ion content of 57 ppm and an average particle diameter of 43 μm, the Na$^+$ ion content being determined by measuring an aqueous layer by ion chromatography, the aqueous layer being heat extract from aluminum oxide powders with pure water at 120° C. for 48 hours; and (C) 200 parts by mass of crushed aluminum oxide B having Na$^+$ ion content of 11 ppm and an average particle diameter of 1.2 μm, the Na$^+$ ion content being determined by measuring an aqueous layer by ion chromatography, the aqueous layer being heat extract from aluminum oxide powders with pure water at 120° C. for 48 hours.

Subsequently, the heat-treated mixture was sufficiently cooled to room temperature (25° C.), and then 0.02 parts by mass of ethynylcyclohexanol, and additionally (D) 9.4 parts by mass of dimethylpolysiloxane blocked with a dimethylhydrogensiloxy group represented by the following general formula (7) and having a viscosity at 25° C. of 17 mPa·s (SiH groups in the polysiloxane of the formula (7)/total SiVi groups in the dimethylpolysiloxane with both molecular chain ends blocked with dimethylvinylsiloxy groups=0.79, and total SiH groups in polysiloxanes of the formulae (5) and (7)/SiVi groups in a dimethylpolysiloxane with both molecular chain ends blocked with dimethylvinylsiloxy groups=0.9) were uniformly mixed at room temperature (25° C.) for 20 minutes to obtain a second liquid of a thermally-conductive addition-curable silicone composition 1.

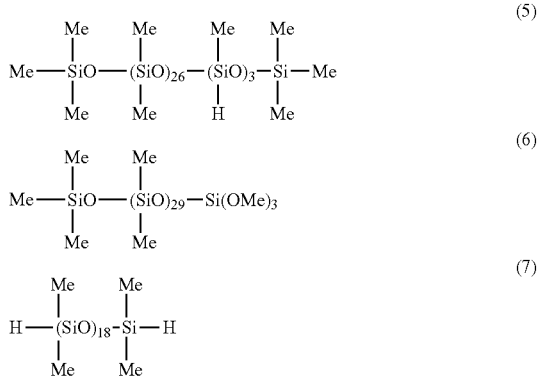

Comparative Example 1

A thermally-conductive addition-curable silicone composition 2 (first liquid and second liquid) was obtained in the same manner as described in Example 1 except that cation-and-anion-exchange type IXEPLAS-A1 (manufactured by Toagosei Co., Ltd.) was not added in the first liquid.

Comparative Example 2

A thermally-conductive addition-curable silicone composition 3 (first liquid and second liquid) was obtained in the same manner as Example 1 except that the cation-and-anion-exchange type IXEPLAS-A1 (manufactured by Toagosei Co., Ltd.) in Example 1 was changed to 1.00 part by mass of an anion-exchange type trapping agent IXE500 (manufactured by Toagosei Co., Ltd.).

Comparative Example 3

In a 5 L planetary mixer manufactured by INOUE MFG., INC., the following were added and mixed, and subjected to heat treatment and mixing for one hour at 100° C.: (A) 44.8 parts by mass of dimethylpolysiloxane with both molecular chain ends blocked with dimethylvinylsiloxy groups having a viscosity of 600 mPa·s; (H) 9 parts by mass of the organopolysiloxane represented by the above general formula (6) and having a viscosity at 25° C. of 30 mPa·s; (C) 300 parts by mass of fused spherical aluminum oxide A having $Na^+$ ion content of 57 ppm and an average particle diameter of 43 μm, the $Na^+$ ion content being determined by measuring an aqueous layer by ion chromatography, the aqueous layer being heat extract from aluminum oxide powders with pure water at 120° C. for 48 hours; and (C) 200 parts by mass of crushed aluminum oxide B having $Na^+$ ion content of 11 ppm and an average particle diameter of 1.2 μm, the $Na^+$ ion content being determined by measuring an aqueous layer by ion chromatography, the aqueous layer being heat extract from aluminum oxide powders with pure water at 120° C. for 48 hours.

Subsequently, a second liquid of a thermally-conductive addition-curable silicone composition 4 was obtained by sufficiently cooling the heat-treated mixture to room temperature (25° C.), and then uniformly mixing at room temperature (25° C.) for 20 minutes with the following: 0.02 parts by mass of ethynylcyclohexanol; (B) 1.26 parts by mass of methylhydrogen-dimethylpolysiloxane blocked with a trimethylsiloxy group, represented by the above general formula (5) and having a viscosity at 25° C. of 28 mPa·s (SiH group in the polysiloxane of the formula (5)/total SiVi groups in the dimethylpolysiloxane with both molecular chain ends blocked with dimethylvinylsiloxy groups=0.11); and additionally, (D) 9.4 parts by mass of dimethylpolysiloxane blocked with a dimethylhydrogensiloxy group, represented by the above general formula (7) and having a viscosity at 25° C. of 17 mPa·s (SiH groups in the polysiloxane of the formula (7)/total SiVi groups in the dimethylpolysiloxane with both molecular chain ends blocked with dimethylvinylsiloxy groups=0.79, and total SiH groups in the polysiloxanes of the formulae (5) and (7)/SiVi group in the dimethylpolysiloxane with both molecular chain ends blocked with dimethylvinylsiloxy groups=0.9). Note that the first liquid in Example 1 was not changed anything and used as a first liquid of the thermally-conductive addition-curable silicone composition 4.

Comparative Example 4

A thermally-conductive addition-curable silicone composition 5 (first liquid and second liquid) was obtained in the same manner as Example 1 except that the heat treatment temperature described in Example 1 was changed to 50° C.

Comparative Example 5

A thermally-conductive addition-curable silicone composition 6 (first liquid and second liquid) was obtained in the same manner as Example 1 except that the fused spherical aluminum oxide A described in Example 1 was replaced with fused spherical aluminum oxide C having $Na^+$ ion content of 111 ppm and an average particle diameter of 41 μm, the $Na^+$ ion content being determined by measuring an aqueous layer by ion chromatography, the aqueous layer being heat extract from aluminum oxide powders with pure water at 120° C. for 48 hours, and the crushed aluminum oxide B described in Example 1 was replaced with crushed aluminum oxide D having $Na^+$ ion content of 103 ppm and an average particle diameter of 1.0 μm, the $Na^+$ ion content being determined by measuring an aqueous layer by ion chromatography, the aqueous layer being heat extract from aluminum oxide powders with pure water at 120° C. for 48 hours.

Example 2

In a 5 L planetary mixer manufactured by INOUE MFG., INC., the following were added and mixed, and subjected to heat treatment and mixing for one hour at 100° C.: (A) 57.2 parts by mass of dimethylpolysiloxane with both molecular chain ends blocked with dimethylvinylsiloxy groups having a viscosity of 400 mPa·s; (H) 117 parts by mass of the organopolysiloxane represented by the above general formula (6) and having a viscosity at 25° C. of 30 mPa·s; (C) 2,418 parts by mass of fused spherical aluminum oxide E having $Na^+$ ion content of 52 ppm and an average particle diameter of 60 μm, the $Na^+$ ion content being determined by measuring an aqueous layer by ion chromatography, the aqueous layer being heat extract from aluminum oxide powders with pure water at 120° C. for 48 hours; and (C) 907 parts by mass of crushed aluminum oxide B having $Na^+$ ion content of 11 ppm and an average particle diameter of 1.2 μm, the $Na^+$ ion content being determined by measuring an aqueous layer by ion chromatography, the aqueous layer being heat extract from aluminum oxide powders with pure water at 120° C. for 48 hours.

Subsequently, the heat-treated mixture was sufficiently cooled to room temperature (25° C.), and then the cooled mixture, (E) 1.00 part by mass of a vinylsiloxane complex of chloroplatinic acid (Pt content of 1 mass %), and (F) 2.00 parts by mass of the cation-and-anion-exchange type ion-trapping agent IXEPLAS-A1 (manufactured by Toagosei Co., Ltd.) were uniformly mixed at room temperature (25° C.) for 20 minutes to obtain a first liquid of a thermally-conductive addition-curable silicone composition 7.

In a 5 L planetary mixer manufactured by INOUE MFG., INC., the following were added and mixed, and subjected to heat treatment and mixing for one hour at 100° C.: (A) 42.8 parts by mass of dimethylpolysiloxane with both molecular chain ends blocked with dimethylvinylsiloxy groups having a viscosity of 400 mPa·s; (B) 2.33 parts by mass of methylhydrogen-dimethylpolysiloxane blocked with a trimethylsiloxy group, represented by the above general formula (5) and having a viscosity at 25° C. of 28 mPa·s (SiH groups in the polysiloxane of the formula (5)/total SiVi groups in the dimethylpolysiloxane with both molecular chain ends blocked with dimethylvinylsiloxy groups=0.15); (H) 117 parts by mass of the organopolysiloxane represented by the above general formula (6) and having a viscosity at 25° C. of 30 mPa·s; (C) 2,418 parts by mass of fused spherical aluminum oxide E having Na$^+$ ion content of 52 ppm and an average particle diameter of 60 μm, the Na$^+$ ion content being determined by measuring an aqueous layer by ion chromatography, the aqueous layer being heat extract from aluminum oxide powders with pure water at 120° C. for 48 hours; and (C) 907 parts by mass of crushed aluminum oxide B having Na$^+$ ion content of 11 ppm and an average particle diameter of 1.2 μm, the Na$^+$ ion content being determined by measuring an aqueous layer by ion chromatography, the aqueous layer being heat extract from aluminum oxide powders with pure water at 120° C. for 48 hours.

Subsequently, a second liquid of a thermally-conductive addition-curable silicone composition 7 was obtained by sufficiently cooling the heat-treated mixture to room temperature (25° C.), and then uniformly mixing at room temperature (25° C.) for 20 minutes with the following: 0.11 parts by mass of ethynylcyclohexanol; and additionally, (D) 13.0 parts by mass of dimethylpolysiloxane blocked with a dimethylhydrogensiloxy group, represented by the above general formula (7) and having a viscosity at 25° C. of 17 mPa·s (SiH groups in the polysiloxane of the formula (7)/total SiVi groups in the dimethylpolysiloxane with both molecular chain ends blocked with dimethylvinylsiloxy groups=0.85, and total SiH groups in the polysiloxanes of the formulae (5) and (7)/SiVi group in the dimethylpolysiloxane with both molecular chain ends blocked with dimethylvinylsiloxy groups 1.0).

Comparative Example 6

A thermally-conductive addition-curable silicone composition 8 (first liquid and second liquid) was obtained in the same manner as Example 2 except that the cation-and-anion-exchange type IXEPLAS-A1 (manufactured by Toagosei Co., Ltd.) was not added in the first liquid as described in Example 2.

Comparative Example 7

A thermally-conductive addition-curable silicone composition 9 (first liquid and second liquid) was obtained in the same manner as Example 2 except that the cation-and-anion-exchange type IXEPLAS-A1 (manufactured by Toagosei Co., Ltd.) in Example 2 was changed to 1.00 part by mass of the anion-exchange type ion-trapping agent IXE500 (manufactured by Toagosei Co., Ltd.).

Comparative Example 8

In a 5 L planetary mixer manufactured by INOUE MFG., INC., the following were added and mixed, and subjected to heat treatment and mixing for one hour at 100° C.: (A) 42.8 parts by mass of dimethylpolysiloxane with both molecular chain ends blocked with dimethylvinylsiloxy groups having a viscosity of 400 mPa·s; (H) 117 parts by mass of the organopolysiloxane represented by the above general formula (6) and having a viscosity at 25° C. of 30 mPa·s; (C) 2,418 parts by mass of fused spherical aluminum oxide E having Na$^+$ ion content of 52 ppm and an average particle diameter of 60 μm, the Na$^+$ ion content being determined by measuring an aqueous layer by ion chromatography, the aqueous layer being heat extract from aluminum oxide powders with pure water at 120° C. for 48 hours; and (C) 907 parts by mass of crushed aluminum oxide B having Na ion content of 11 ppm and an average particle diameter of 1.2 μm, the Na$^+$ ion content being determined by measuring an aqueous layer by ion chromatography, the aqueous layer being heat extract from aluminum oxide powders with pure water at 120° C. for 48 hours.

Subsequently, a second liquid of a thermally-conductive addition-curable silicone composition 10 was obtained by sufficiently cooling the heat-treated mixture to room temperature (25° C.), and then uniformly mixing at room temperature (25° C.) for 20 minutes with the following: 0.11 parts by mass of ethynylcyclohexanol, (B) 2.33 parts by mass of methylhydrogen-dimethylpolysiloxane blocked with a trimethylsiloxy groups, represented by the above general formula (5) and having a viscosity at 25° C. of 28 mPa·s (SiH groups in the polysiloxane of the formula (5)/total SiVi groups in the dimethylpolysiloxane with both molecular chain ends blocked with dimethylvinylsiloxy groups=0.15); and additionally, (D) 13.0 parts by mass of dimethylpolysiloxane blocked with a dimethylhydrogensiloxy group, represented by the above general formula (7) and having a viscosity at 25° C. of 17 mPa·s (SiH groups in the polysiloxane of the formula (7)/total SiVi groups in the dimethylpolysiloxane with both molecular chain ends blocked with dimethylvinylsiloxy groups=0.85, and total SiH groups in the polysiloxanes of the formulae (5) and (7)/SiVi groups in the dimethylpolysiloxane with both molecular chain ends blocked with dimethylvinylsiloxy groups=1.0). Note that the first liquid in Example 2 was not changed anything and used as a first liquid of the thermally-conductive addition-curable silicone composition 10.

Comparative Example 9

A thermally-conductive addition-curable silicone composition 11 (first liquid and second liquid) was obtained in the same manner as Example 2 except that the heat treatment temperature described in Example 2 was changed to 50° C.

Comparative Example 10

A thermally-conductive addition-curable silicone composition 12 (first liquid and second liquid) was obtained in the same manner as Example 2 except that the fused spherical aluminum oxide E described in Example 2 was replaced with fused spherical aluminum oxide F having Na$^+$ ion content of 108 ppm and an average particle diameter of 61 μm, the Na$^+$ ion content being determined by measuring an aqueous layer by ion chromatography, the aqueous layer being heat extract from aluminum oxide powders with pure water at 120° C. for 48 hours, and the crushed aluminum oxide B described in Example 2 was replaced with crushed aluminum oxide D having Na$^+$ ion content of 103 ppm and an average particle diameter of 1.0 μm, the Na$^+$ ion content being determined by measuring an aqueous layer by ion chromatography, the aqueous layer being heat extract from aluminum oxide powders with pure water at 120° C. for 48 hours.

The viscosity of the thermally-conductive addition-curable silicone compositions 1 (first liquid and second liquid) to 12 (first liquid and second liquid) described in Examples and Comparative Examples described above was measured by a spiral viscometer: Malcom viscometer (type PC-10AA at a rotation number of 10 rpm) under an environment of 25° C., and the thermal conductivity of the silicone compositions before curing was measured at 25° C. using a hot-disk-method thermophysical property measuring device TPS 2500 S manufactured by Kyoto Electronics Manufacturing Co., Ltd by hot disk method according to ISO 22007-2.

Then, using a static mixer (MXA 6.3-21) manufactured by NORITAKE CO., LIMITED, the first liquid and the second liquid of each composition at a mass ratio of 1:1 were mixed and discharged at normal temperature (25° C.) so as to be uniform. Then, the resultant was sufficiently vacuum-deaerated and poured into molds that provide a cured thickness of 6 mm, and cured at 25° C. for 24 hours to obtain cured products. The degree of hardness (hardness) of the cured products was measured by a Shore 00 hardness tester specified by ASTM D 2240-05. Furthermore, the first liquid and the second liquid of each composition were left in a thermostatic chamber of 25° C. for 6 months, and then the viscosity, thermal conductivity, and hardness were measured in the same manner as described above and compared with those at the initial stage. The compared results are shown in Table 1.

even after long-term preservation (25° C., 6 months), and also no change was observed in hardness of the obtained cured products. In contrast, in the compositions of Comparative Examples 1 to 10, no significant change was observed in viscosity and thermal conductivity after long-term preservation, but hardness of the obtained cured product changed by 10 points or more from that of the initial stage. This shows that, since Comparative Examples 1 and 6 do not contain the ion-trapping agent, the ion-trapping agent is necessary for sufficiently curing even after long-term preservation. Furthermore, Comparative Examples 2 and 7 contain the anion-exchange type ion-trapping agent, which shows necessity of the ion-trapping agent other than an anion-exchange type. In this manner, Comparative Examples 3 and 8 show that, as the second liquid, the component (B) is preferably subjected to heat treatment and

TABLE 1

| Physical property confirmation items | Ex. 1 | Comp. Ex. 1 | Comp. Ex. 2 | Comp. Ex 3 | Comp. Ex. 4 | Comp. Ex. 5 |
|---|---|---|---|---|---|---|
| Viscosity (Pa · s) of 1st liquid/2nd liquid: initial stage | 134/94 | 133/91 | 136/100 | 129/91 | 131/95 | 139/99 |
| Thermal conductivity (W/m · K) of 1st liquid/2nd liquid: initial stage | 2.3/2.3 | 2.3/2.3 | 2.3/2.3 | 2.3/2.3 | 2.3/2.3 | 2.3/2.3 |
| Hardness (Shore OO): initial stage | 60 | 59 | 61 | 60 | 59 | 57 |
| Viscosity (Pa · s) of 1st liquid/2nd liquid: after 6 months preservation at 25° C. | 132/91 | 134/92 | 133/103 | 125/94 | 134/90 | 138/103 |
| Thermal conductivity (W/m · K) of 1st liquid/2nd liquid: after 6 months preservation at 25° C. | 2.3/2.3 | 2.3/2.3 | 2.3/2.3 | 2.3/2.3 | 2.3/2.3 | 2.3/2.3 |
| Hardness (Shore OO): after 6 months preservation at 25° C. | 60 | 39 | 40 | 48 | 47 | 46 |

| Physical-property confirmation items | Ex. 2 | Comp. Ex. 6 | Comp. Ex. 7 | Comp. Ex. 8 | Comp. Ex. 9 | Comp. Ex. 10 |
|---|---|---|---|---|---|---|
| Viscosity (Pa · s) of 1st liquid/2nd liquid: initial stage | 296/290 | 290/287 | 304/298 | 294/289 | 302/292 | 304/293 |
| Thermal conductivity (W/m · K) of 1st liquid/2nd liquid: initial stage | 6.6/6.6 | 6.6/6.6 | 6.6/6.6 | 6.6/6.6 | 6.6/6.6 | 6.6/6.6 |
| Hardness (Shore OO): initial stage | 60 | 58 | 59 | 59 | 57 | 56 |
| Viscosity (Pa · s) of 1st liquid/2nd liquid: after 6 months preservation at 25° C. | 294/294 | 301/288 | 302/305 | 299/297 | 307/294 | 304/299 |
| Thermal conductivity (W/m · K) of 1st liquid/2nd liquid: after 6 months preservation at 25° C. | 6.6/6.6 | 6.6/6.6 | 6.6/6.6 | 6.6/6.6 | 6.6/6.6 | 6.6/6.6 |
| Hardness (Shore OO): after 6 months preservation at 25° C. | 60 | 31 | 33 | 48 | 44 | 43 |

As clearly shown by the above results, in the compositions of Examples 1 and 2 of the present invention, no change was observed in viscosity and thermal conductivity mixing with the components (A) and (C). Furthermore, Comparative Examples 4 and 9 show that the heat treatment temperature is preferably set to 70° C. or higher after mixing the components (A), (B), and (C). This may be because surface treatment of the component (C) with the components (A) and (B) does not progress. Furthermore, Comparative Examples 5 and 10 also show that Na+ ion content specified in the component (C) is preferably 100 ppm or less. Accordingly, the present invention provides a thermally-conductive two-part addition-curable silicone composition and a cured product thereof having long-term preservation stability.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

INDUSTRIAL APPLICABILITY

The thermally-conductive silicone cured product obtained by curing the thermally-conductive two-part addition-curable silicone composition obtained by the present invention can maintain stable hardness without being affected by a thermally-conductive filler even after long-term preservation, and therefore is expected to improve reliability in heat dissipation and protection applications of electronic components such as power devices, transistors, thyristors, and central processing units (CPUs).

The invention claimed is:

1. A thermally-conductive two-part addition-curable silicone composition, comprising a first liquid and a second liquid, the first liquid comprising:
a heat-treated mixture including
(A) an organopolysiloxane represented by the following average composition formula (1),

wherein R independently represents an alkenyl group, $R^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4, the organopolysiloxane having at least two alkenyl groups bonded to a silicon atom in one molecule, and (C) aluminum oxide having Na+ ion content equal to or lower than 100 ppm, the Na+ ion content being determined by measuring an aqueous layer by ion chromatography, the aqueous layer being heat extract from aluminum oxide powders with pure water at 120° C. for 48 hours,
the component (C) having been subjected to surface treatment with a part of the component (A);
(E) a platinum-group metal catalyst; and
(F) an ion-trapping agent of a cation-exchange type and/or a cation-and-anion-exchange type, carrying at least one element selected from Zr, Bi, Sb, Mg, and Al,
the second liquid comprising:
a heat-treated mixture including
(A) an organopolysiloxane represented by the following average composition formula (1),

wherein R independently represents an alkenyl group, $R^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4, the organopolysiloxane having at least two alkenyl groups bonded to a silicon atom in one molecule, (B) an organohydrogenpolysiloxane represented by the following average composition formula (2),

wherein $R^2$ independently represents an unsubstituted or substituted monovalent hydrocarbon group having no aliphatic unsaturated bond, "c" represents 0.7 to 2.2, "d" represents 0.001 to 0.5, and "c+d" represents a positive number satisfying 0.8 to 2.5, the organohydrogenpolysiloxane having at least three hydrogen atoms bonded to a silicon atom in one molecule, and (C) aluminum oxide having Na+ ion content equal to or lower than 100 ppm, the Na+ ion content being determined by measuring an aqueous layer by ion chromatography, the aqueous layer being heat extract from aluminum oxide powders with pure water at 120° C. for 48 hours, the component (C) having been subjected to surface treatment with a part of the component (B); and (D) an organohydrogenpolysiloxane represented by the following average composition formula (3),

wherein $R^3$ independently represents an unsubstituted or substituted monovalent hydrocarbon group having no aliphatic unsaturated bond, "e" represents 0.7 to 2.2, "f" represents 0.001 to 0.5, and "e+f" represents a positive number satisfying 0.8 to 2.5, the organohydrogenpolysiloxane having at least two hydrogen atoms bonded to a silicon atom in one molecule, wherein the first liquid does not contain the components (B) and (D), and the second liquid does not contain the components (E) and (F), in the composition, the component (A) is contained in an amount of 100 parts by mass in total, the component (B) is contained in an amount such that a number of the hydrogen atom bonded to a silicon atom (SiH group) in the component (B) is 0.1 to 2 per one alkenyl group in the component (A), the component (C) is contained in an amount of 1,000 to 7,000 parts by mass in total, the component (D) is contained in an amount such that a number of the hydrogen atom bonded to a silicon atom (SiH group) in the component (D) is 0.01 to 3 per one alkenyl group in the component (A), the component (E) is contained in an amount of 1 to 200 ppm in mass of a platinum group metal relative to the component (A), and the component (F) is contained in an amount of 0.01 to 10 parts by mass, and the first liquid and the second liquid each have a thermal conductivity of 2.0 to 7.0 W/m·K in a hot disk method according to ISO 22007-2, and the first liquid and the second liquid each have a viscosity at 25° C. of 30 to 800 Pa·s when measurement is performed at a rotation number of 10 rpm at shear rate 6 (1/sec) in a rotor A using a spiral viscometer.

2. The thermally-conductive two-part addition-curable silicone composition according to claim 1, wherein a total amount of the SiH groups in the component (B) and the component (D) is in a ratio of 0.11 to 5 per one alkenyl group in the component (A).

3. The thermally-conductive two-part addition-curable silicone composition according to claim 1, wherein the heat-treated mixture in the first liquid and the heat-treated mixture in the second liquid further comprise
(G) a silane coupling agent and/or
(H) an organopolysiloxane represented by the following general formula (4),

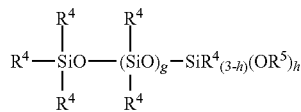   (4)

wherein each $R^4$ independently represents an unsubstituted or substituted monovalent hydrocarbon group, $R^5$ independently represents an alkyl group, an alkoxyalkyl group, an alkenyl group, or an acyl group, "g" represents an integer of 5 to 100, and "h" represents an integer of 1 to 3, the organopolysiloxane having a viscosity at 25° C. of 0.01 to 30 Pa·s.

4. The thermally-conductive two-part addition-curable silicone composition according to claim 2, wherein the heat-treated mixture in the first liquid and the heat-treated mixture in the second liquid further comprise
(G) a silane coupling agent and/or
(H) an organopolysiloxane represented by the following general formula (4),

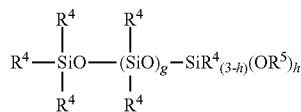   (4)

wherein each $R^4$ independently represents an unsubstituted or substituted monovalent hydrocarbon group, $R^5$ independently represents an alkyl group, an alkoxyalkyl group, an alkenyl group, or an acyl group, "g" represents an integer of 5 to 100, and "h" represents an integer of 1 to 3, the organopolysiloxane having a viscosity at 25° C. of 0.01 to 30 Pa·s.

5. A method for producing a thermally-conductive two-part addition-curable silicone composition to prepare a composition comprising a first liquid and a second liquid, the method comprising a process of preparing the first liquid and a process of preparing the second liquid, wherein the process of preparing the first liquid comprises: performing heat treatment at a temperature of 70° C. or more to a mixture including
(A) an organopolysiloxane represented by the following average composition formula (1), $$R_a R^1_b SiO_{(4-a-b)/2} \qquad (1)$$

wherein R independently represents an alkenyl group, $R^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4, the organopolysiloxane having at least two alkenyl groups bonded to a silicon atom in one molecule, and
(C) aluminum oxide having Na⁺ ion content equal to or lower than 100 ppm, the Na⁺ ion content being determined by measuring an aqueous layer by ion chromatography, the aqueous layer being heat extract from aluminum oxide powders with pure water at 120° C. for 48 hours,
to perform surface treatment of the component (C) with a part of the component (A), and subsequently adding and mixing to the cooled heat-treated mixture
(E) a platinum-group metal catalyst, and
(F) an ion-trapping agent of a cation-exchange type and/or a cation-and-anion-exchange type carrying at least one element selected from Zr, Bi, Sb, Mg, and Al; and
the process of preparing the second liquid comprises: performing heat treatment at a temperature of 70° C. or more to a mixture including
(A) an organopolysiloxane represented by the following average composition formula (1), $$R_a R^1_b SiO_{(4-a-b)/2} \qquad (1)$$

wherein R independently represents an alkenyl group, $R^1$ independently represents an unsubstituted or substituted monovalent hydrocarbon group having no aliphatic unsaturated bond, "a" represents 0.0001 to 0.2, "b" represents 1.7 to 2.2, and "a+b" represents a positive number satisfying 1.9 to 2.4, the organopolysiloxane having at least two alkenyl groups bonded to a silicon atom in one molecule, and
(B) an organohydrogenpolysiloxane represented by the following average composition formula (2), $$R^2_c H_d SiO_{(4-c-d)/2} \qquad (2)$$

wherein $R^2$ independently represents an unsubstituted or substituted monovalent hydrocarbon group having no aliphatic unsaturated bond, "c" represents 0.7 to 2.2, "d" represents 0.001 to 0.5, and "c+d" represents a positive number satisfying 0.8 to 2.5, the organohydrogenpolysiloxane having at least three hydrogen atoms bonded to a silicon atom in one molecule, and
(C) aluminum oxide having Na⁺ ion content equal to or lower than 100 ppm, the Na⁺ ion content being determined by measuring an aqueous layer by ion chromatography, the aqueous layer being heat extract from aluminum oxide powders with pure water at 120° C. for 48 hours,
to perform surface treatment of the component (C) with a part of the component (B), and subsequently adding and mixing to the cooled heat-treated mixture
(D) an organohydrogenpolysiloxane represented by the following average composition formula (3), $$R^3_e H_f SiO_{(4-e-f)/2} \qquad (3)$$

wherein $R^3$ independently represents an unsubstituted or substituted monovalent hydrocarbon group having no aliphatic unsaturated bond, "e" represents 0.7 to 2.2, "f" represents 0.001 to 0.5, and "e+f" represents a positive number satisfying 0.8 to 2.5, the organohydrogenpolysiloxane having at least two hydrogen atoms bonded to a silicon atom in one molecule,
wherein the first liquid does not contain the components (B) and (D), and the second liquid does not contain the components (E) and (F),
in the composition, the component (A) is contained in an amount of 100 parts by mass in total, the component (B) is contained in an amount such that a number of the hydrogen atom bonded to a silicon atom (SiH group) in the component (B) is 0.1 to 2 per one alkenyl group in the component (A), the component (C) is contained in an amount of 1,000 to 7,000 parts by mass in total, the component (D) is contained in an amount such that a number of the hydrogen atom bonded to a silicon atom (SiH group) in the component (D) is 0.01 to 3 per one alkenyl group in the component (A), the component (E) is contained in an amount of 1 to 200 ppm in mass of a platinum group metal relative to the component (A), and the component (F) is contained in an amount of 0.01 to 10 parts by mass, and a thermal conductivity of each of the obtained first liquid and the second liquid is 2.0 to 7.0 W/m·K in a hot disk method according to ISO 22007-2, and a viscosity at 25° C. of each of the obtained first liquid and the second liquid is 30 to 800 Pa·s when measurement is performed at a rotation number of 10 rpm at shear rate 6 (1/sec) in a rotor A using a spiral viscometer.

6. The method for producing a thermally-conductive two-part addition-curable silicone composition according to claim 5, wherein a total amount of the SiH groups in the component (B) and the component (D) is in a ratio of 0.11 to 5 per one alkenyl group in the component (A).

7. The method for producing a thermally-conductive two-part addition-curable silicone composition according to claim 5, further comprising:

mixing the mixture to be heat-treated in the first liquid and the mixture to be heat-treated in the second liquid with (G) a silane coupling agent and/or (H) an organopolysiloxane represented by the following general formula (4),

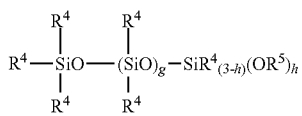

(4)

wherein each $R^4$ independently represents an unsubstituted or substituted monovalent hydrocarbon group, $R^5$ independently represents an alkyl group, an alkoxyalkyl group, an alkenyl group, or an acyl group, "g" represents an integer of 5 to 100, and "h" represents an integer of 1 to 3, the organopolysiloxane having a viscosity at 25° C. of 0.01 to 30 Pa·s; and performing heat treatment.

8. The method for producing a thermally-conductive two-part addition-curable silicone composition according to claim 6, further comprising:

mixing the mixture to be heat-treated in the first liquid and the mixture to be heat-treated in the second liquid with (G) a silane coupling agent and/or (H) an organopolysiloxane represented by the following general formula (4),

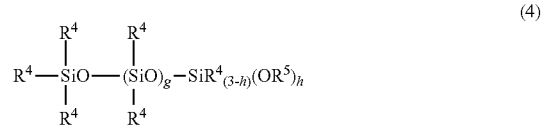

(4)

wherein each $R^4$ independently represents an unsubstituted or substituted monovalent hydrocarbon group, $R^5$ independently represents an alkyl group, an alkoxyalkyl group, an alkenyl group, or an acyl group, "g" represents an integer of 5 to 100, and "h" represents an integer of 1 to 3, the organopolysiloxane having a viscosity at 25° C. of 0.01 to 30 Pa·s; and performing heat treatment.

\* \* \* \* \*